US007657359B2

(12) United States Patent
Shinozaki et al.

(10) Patent No.: US 7,657,359 B2
(45) Date of Patent: Feb. 2, 2010

(54) APPARATUS AND METHOD FOR CALCULATING WORK LOAD OF ENGINE

(75) Inventors: Koichiro Shinozaki, Saitama (JP); Yuji Yasui, Saitama (JP); Katsura Okubo, Saitama (JP); Masahiro Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/665,054

(22) PCT Filed: Sep. 29, 2005

(86) PCT No.: PCT/JP2005/017961

§ 371 (c)(1), (2), (4) Date: Jan. 14, 2009

(87) PCT Pub. No.: WO2006/040934

PCT Pub. Date: Apr. 20, 2006

(65) Prior Publication Data

US 2009/0132144 A1 May 21, 2009

(30) Foreign Application Priority Data

Oct. 14, 2004 (JP) ............................ 2004-300081

(51) Int. Cl.
*B60T 7/12* (2006.01)
*F02M 7/00* (2006.01)

(52) U.S. Cl. .................. 701/102; 123/435; 123/406.23

(58) Field of Classification Search ................ 701/101, 701/102, 103; 123/434, 435, 406.23, 673, 123/478, 480
See application file for complete search history.

(56) References Cited

U.S. PATENT DOCUMENTS 4,197,767 A * 4/1980 Leung ........................ 477/98

(Continued)

FOREIGN PATENT DOCUMENTS

JP 62-195462 8/1987

(Continued)

OTHER PUBLICATIONS

Keiichi Nagashima et al., "Fourier Kyusugata Nensho Kaiseki Sochi no Kaihatsu", Transactions of the Society of Automotive Engineers of Japan, 2002, pp. 31-36, vol. 33.

(Continued)

*Primary Examiner*—John T Kwon
(74) *Attorney, Agent, or Firm*—Arent Fox LLP

(57) ABSTRACT

Work done by an engine can be accurately calculated regardless of the part in an observation section where the cylinder internal pressure signal is detected. The apparatus for calculating the work done by an engine establishes in advance correlation of phase between the cylinder internal pressure of the engine and a reference signal composed of a predetermined frequency component as a reference phase relation. A means for detecting the cylinder internal pressure of the engine for a predetermined observation section is provided. A reference signal corresponding to the detected cylinder internal pressure of the engine is calculated so that the reference phase relation is satisfied. A correlation coefficient of the detected cylinder internal pressure of the engine and the calculated reference signal is calculated for the observation section and the work done by the engine is calculated in accordance with the correlation coefficient.

30 Claims, 19 Drawing Sheets

U.S. PATENT DOCUMENTS

| | | | | | |
|---|---|---|---|---|---|
| 4,347,571 | A | * | 8/1982 | Leung et al. | 701/111 |
| 5,353,636 | A | * | 10/1994 | Sakurai et al. | 73/114.11 |
| 5,386,372 | A | * | 1/1995 | Kobayashi et al. | 700/280 |
| 5,638,305 | A | * | 6/1997 | Kobayashi et al. | 700/280 |
| 5,771,483 | A | * | 6/1998 | Moine et al. | 701/110 |

FOREIGN PATENT DOCUMENTS

| | | | |
|---|---|---|---|
| JP | 5-549 | B2 | 1/1993 |
| JP | 06-033827 | A | 2/1994 |
| JP | 07-229443 | A | 8/1995 |
| JP | 03-057937 | B2 | 3/1996 |
| JP | 08-312407 | A | 11/1996 |
| JP | 2001-263153 | A | 9/2001 |

OTHER PUBLICATIONS

Keiichi Nagashima et al., “New Indicated Mean Effective Pressure Measuring Method and Its Applications”, In: SAE Trans (Soc. Automot. Eng.), 2002, pp. 2982-2987, vol. 111 sec. 3.

* cited by examiner (a)

(b)

(a)

| Fourier coefficient DC, cosine component | Value | Fourier coefficient sine component | Value |
|---|---|---|---|
| a0 (DC) | 1.974e-017 | | |
| a1 | -0.06387 | b1 | 4.356 |
| a2 | -0.0187 | b2 | 0.707 |
| a3 | 0.0007413 | b3 | 0.004717 |
| a4 | -2.195e-005 | b4 | -0.002233 |

(b)

(a)

(b)

APPARATUS AND METHOD FOR CALCULATING WORK LOAD OF ENGINE

CROSS-REFERENCE TO RELATED APPLICATION

This application is a National Stage entry of International Application No. PCT/JP2005/017961, filed Sep. 29, 2005, the entire specification claims and drawings of which are incorporated herewith by reference.

TECHNICAL FIELD

The present invention relates to an apparatus and a method for calculating work performed by an internal-combustion engine.

BACKGROUND ART

Japanese Patent Application Publication listed below discloses a technique for calculating an indicated mean effective pressure using Fourier coefficients obtained by expanding a pressure within a combustion chamber (referred to as an in-cylinder pressure hereinafter) of a combustion engine (referred to as an engine hereinafter) into Fourier series.

Patent application publication 1: No. H8-20339

DISCLOSURE OF THE INVENTION

Problems to be Solved by the Invention

Each of Fourier coefficients for a certain signal is a correlation coefficient between the signal and a reference signal consisting of the corresponding frequency component. In general, the value of such a correlation coefficient has characteristics that the value significantly changes depending where a time interval over which the signal is observed (referred to as observed interval) is established. In a case where the indicated mean effective pressure is calculated according to the above-described conventional technique, an in-cylinder pressure signal needs to be acquired at a predetermined angle from a top dead center (TDC) of a piston during an intake stroke of the engine so as to extract the in-cylinder pressure signal over a predetermined interval.

However, a signal that is a trigger for acquiring the in-cylinder pressure signal may not be obtained at the predetermined angle from the TDC in the intake stroke. For example, a mechanism for sending a signal in synchronization with the rotation of a crankshaft is often mounted on a vehicle. Due to a structure of such a mechanism, a signal may not be sent out at the predetermined angle position from the TDC in the intake stroke. When the signal, which is a trigger, is not sent out at the predetermined angle position, the observed interval may deviate. Depending on such a positional error of the observed interval, the in-cylinder pressure signal extracted in the observed interval changes. As a result, an error occurs in the correlation coefficient, which prevents that the indicated mean effective pressure is accurately calculated.

Even when the trigger signal is obtained at the predetermined angle position, a phase delay may occur in the in-cylinder pressure signal. As a result, there is a phase delay in the in-cylinder pressure signal extracted in the observed interval. Due to the phase delay, the in-cylinder pressure signal extracted in the observed interval changes. An error occurs in the correlation coefficient and hence the indicated mean effective pressure is not accurately calculated.

Thus, there is a need for a technique that is capable of calculating engine work such as an indicated mean effective pressure even when any part of the in-cylinder pressure signal is extracted in the observed interval.

Means for Solving Problem

According to one aspect of the present invention, a method for calculating work of an engine comprises pre-establishing, as a reference phase relation for a predetermined reference interval, a correlation in phase between an in-cylinder pressure of the engine and a reference signal consisting of a predetermined frequency component. An in-cylinder pressure of the engine is detected for a given observed interval. A reference signal corresponding to the detected in-cylinder pressure of the engine is determined such that the reference phase relation is met. A correlation coefficient between the detected in-cylinder pressure of the engine and the determined reference signal for the observed interval is determined. The engine work is calculated based on the correlation coefficient.

According to this invention, the reference phase relation for the reference interval is established for the in-cylinder pressure signal detected in a given observed interval. Therefore, even when any part of the in-cylinder pressure signal is detected in the observed interval, a correlation coefficient having the same value as the correlation coefficient determined for the reference interval can be determined for the observed interval. Thus, the engine work can be more accurately calculated from the correlation coefficient.

According to one embodiment of the invention, the correlation coefficient is a Fourier coefficient that is obtained by expanding the in-cylinder pressure into Fourier series.

According to one embodiment of the invention, a phase delay of the in-cylinder pressure detected in the observed interval with respect to the in-cylinder pressure in the reference interval is determined. A reference signal same as the reference signal constituting the reference phase relation is established in the observed interval. Then, a phase of the reference signal established in the observed interval is retarded by the determined phase delay to determine the reference signal corresponding to the in-cylinder pressure of the engine detected in the observed interval. Thus, even when a phase delay occurs in the in-cylinder pressure signal, a correlation coefficient having the same value as the correlation coefficient determined for the reference interval can be determined for the observed interval. According to one embodiment, the phase delay is determined in accordance with a detected operating condition of the engine.

According to one embodiment of the invention, a delay of a starting time of the observed interval with respect to a starting time of the reference interval is determined. A reference signal same as the reference signal constituting the reference phase relation is established in the observed interval. Then, a phase of the reference signal established in the observed interval is advanced by the determined delay to determine the reference signal corresponding to the in-cylinder pressure of the engine detected in the observed interval. Thus, even when a starting time of the observed interval has a deviation, a correlation coefficient having the same value as the correlation coefficient determined for the reference interval can be determined for the observed interval. According to one embodiment, the delay is determined in accordance with a relative difference between a starting time of the reference interval and a starting time of the observed interval.

According to another aspect of the present invention, a frequency component desired for calculating work of an engine is determined among frequency components obtained by frequency-resolving a volume change rate of the engine. A correlation in phase between an in-cylinder pressure of the engine and a reference signal consisting of the determined component is pre-established as a reference phase relation for a predetermined reference interval. A reference signal corresponding to an in-cylinder pressure in a predetermined observed interval is determined such that the reference phase relation is met. A first correlation coefficient between the in-cylinder pressure of the engine in the observed interval and the determined reference signal is determined. A second correlation coefficient between the volume change rate of the engine in the observed interval and the determined reference signal is determined. Then, the engine work is calculated based on the first correlation coefficient and the second correlation coefficient.

According to the invention, the reference phase relation in the reference interval is established for the in-cylinder pressure signal detected in the predetermined observed interval. Therefore, even when any part of the in-cylinder pressure signal is detected in the predetermined observed interval, a correlation coefficient having the same value as the correlation coefficient determined for the reference interval can be determined for the observed interval. Thus, the engine work can be more accurately calculated from the correlation coefficient. Moreover, according to the invention, the first and second correlation coefficients need to be determined only for the desired component. Since the desired component can be determined corresponding to a given engine, the engine work can be calculated for an engine having any structure. The sampling frequency of the in-cylinder pressure can be reduced to a degree where the desired component can be extracted.

According to one embodiment of the invention, a stroke volume of the engine is determined. The engine work is calculated based on the stroke volume, the first correlation coefficient and the second correlation coefficient. Thus, the engine work can be more accurately calculated for an engine in which the stroke volume is variable.

According to one embodiment of the invention, an operating condition of the engine is detected. The desired component is determined based on the detected operating condition of the engine. Thus, the desired component can be appropriately determined in accordance with the operating condition of the engine.

According to one embodiment of the invention, the engine work includes an indicated mean effective pressure.

According to another aspect of the invention, an apparatus for implementing the above-described method is provided.

EXPLANATIONS OF LETTERS OR NUMERALS

1 ECU
2 Engine
15 In-cylinder pressure sensor
26 Variable compression ratio mechanism

BEST MODE FOR CARRYING OUT THE INVENTION

Figure 1:
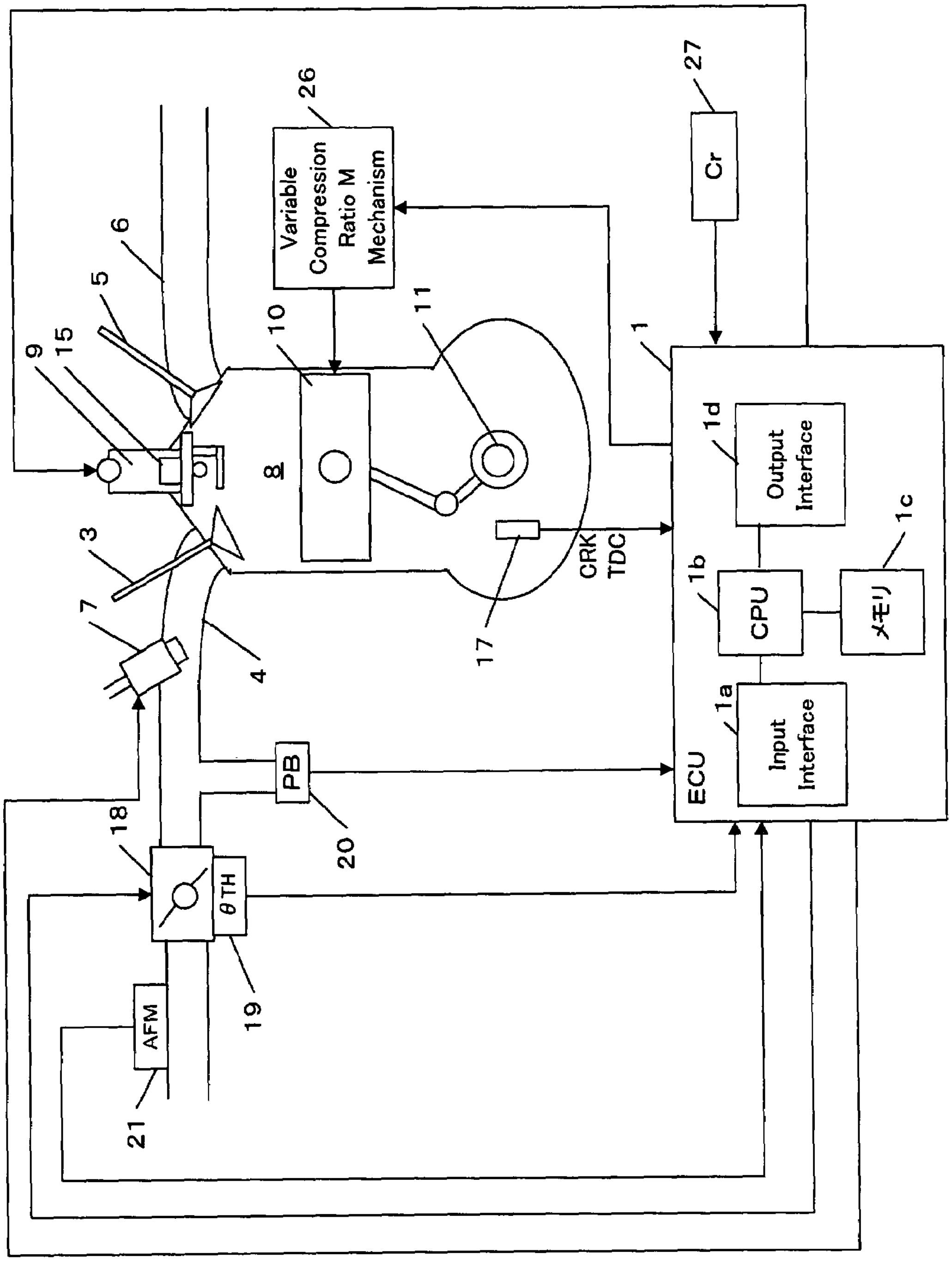
FIG. 1 A diagram schematically showing an engine and its control unit in accordance with one embodiment of the present invention.

Preferred embodiments will be now described referring to the drawings. FIG. 1 shows an overall structure of an engine and its control unit in accordance with one embodiment of the present invention.

An electronic control unit (hereinafter referred to as an ECU) 1 is essentially a computer having a central processing unit (CPU) 1*b*. The ECU1 comprises a memory 1*c* that includes a read only memory (ROM) for storing programs for controlling each part of the vehicle and maps required for executing the programs and a random access memory (RAM)

for providing work areas for operations by the CPU 1*b* and temporarily storing programs and data. The ECU 1 further comprises an input interface 1*a* for receiving data sent from each part of the vehicle and an output interface 1*d* for sending a control signal to each part of the vehicle.

An engine 2 is a 4-cycle engine in this embodiment. The engine 2 is connected to an air intake manifold 4 through an air intake valve 3 and connected to an exhaust manifold 6 through an exhaust valve 5. A fuel injection valve 7 for injecting fuel in accordance with a control signal from the ECU 1 is disposed in the intake manifold 4.

The engine 2 takes air-fuel mixture from air taken from the intake manifold 4 and fuel injected by the fuel injection valve 7 into the combustion chamber 8. A spark plug 9 is provided in the combustion chamber 8 to ignite a spark in accordance with an ignition timing signal from the ECU 1. The air-fuel mixture is combusted by the spark ignited by the spark plug 9. The combustion increases the volume of the mixture, which pushes the piston 10 downward. The reciprocating motion of the piston 10 is converted into the rotation motion of the crankshaft 11.

An in-cylinder pressure sensor 15 is, for example, a piezo-electric element sensor. The in-cylinder pressure sensor 15 is embedded in a portion of the spark plug 9 that contacts the cylinder. The in-cylinder pressure sensor 15 generates a signal corresponding to a rate of change in a pressure within the combustion chamber 8 (in-cylinder pressure) and sends it to the ECU 1. The ECU1 integrates the signal indicating the rate of change in the in-cylinder pressure to generate a signal P indicating the in-cylinder pressure.

A crank angle sensor 17 is disposed in the engine 2. The crank angle sensor 17 outputs a CRK signal and a TDC signal, which are pulse signals, to the ECU 1 in accordance with the rotation of a crankshaft 11.

The CRK signal is a pulse signal that is output at every predetermined crank angle (for example, 30 degrees). The ECU 1 calculates a rotational speed NE of the engine 2 in accordance with the CRK signal. The TDC signal is also a pulse signal that is output at a crank angle associated with the TDC position of the piston 10.

A throttle valve 18 is disposed in an intake manifold 4 of the engine 2. An opening degree of the throttle valve 18 is controlled by a control signal from the ECU 1. A throttle valve opening sensor (θTH) 19, which is connected to the throttle valve 18, provides the ECU 1 with a signal indicating the opening degree of the throttle valve 18.

An intake manifold pressure (Pb) sensor 20 is disposed downstream of the throttle valve 18. The intake manifold pressure Pb detected by the Pb sensor 20 is sent to the ECU 1.

An airflow meter (AFM) 21 is disposed upstream of the throttle valve 18. The airflow meter 21 detects the amount of air passing through the throttle valve 18 and sends it to the ECU 1.

A variable compression ratio mechanism 26 is a mechanism that is capable of changing a compression ratio within the combustion chamber in accordance with a control signal from the ECU 1. The variable compression ratio mechanism 26 can be implemented by any known technique. For example, a technique has been proposed for changing a compression ratio according to the operating condition of the engine by changing the position of the piston using a hydraulic pressure.

A compression ratio sensor 27 is connected to the ECU 1. The compression ratio sensor 27 detects a compression ratio Cr of the combustion chamber and sends it to the ECU 1.

A signal sent to the ECU 1 is passed to the input interface 1*a* and is analogue-digital converted. The CPU 1*b* processes the resulting digital signal in accordance with a program stored in the memory 1*c*, and creates a control signal. The output interface 1*d* sends the control signal to actuators for the fuel injection valve 7, spark plug 9, throttle valve 18, and other mechanical components. The CPU 1*b* can calculate work performed by the engine using digital signals thus converted in accordance with one or more programs stored in the memory 1*c*.

The indicated mean effective pressure is often used as an index representing work performed by an engine. The mean effective pressure is a value obtained by dividing engine work achieved during one combustion cycle by a stroke volume. The indicated mean effective pressure is a value obtained by subtracting from the mean effective pressure, for example, cooling loss, incomplete combustion, and mechanical friction. These indexes may be used to evaluate performance gaps among engines having different total stroke volumes (different engine displacements).

Figure 2:
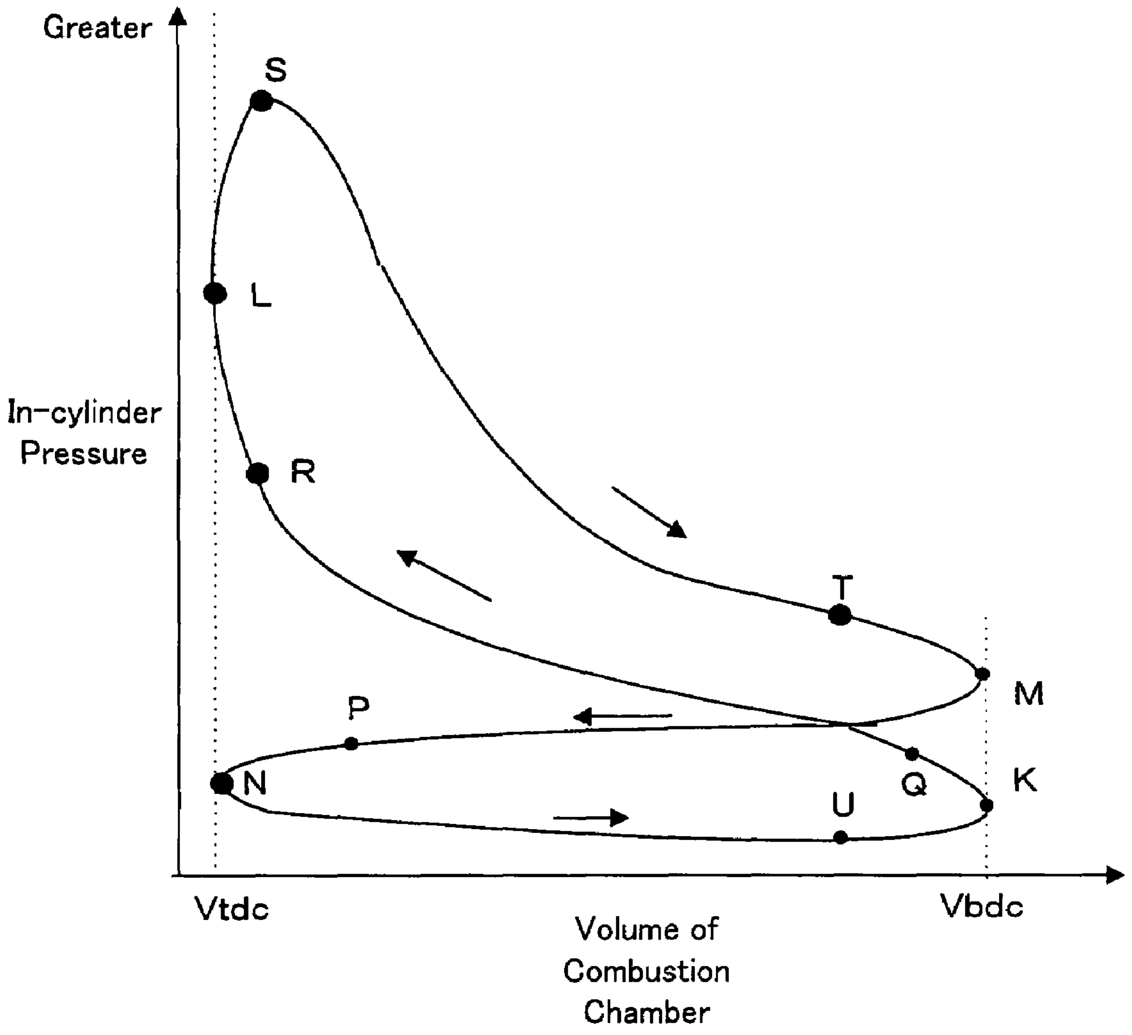
FIG. 2 A diagram showing an indicated mean effective pressure in accordance with one embodiment of the present invention.

FIG. 2 shows a so-called PV chart that indicates a relationship between a volume V and an in-cylinder pressure P of the combustion chamber over one combustion cycle. At P point, the intake valve opens and the intake stroke starts. The in-cylinder pressure continues to decrease until the piston reaches U point, which indicates the minimum value, through N point that is the top dead center (TDC). Thereafter, the piston passes through K point that is the bottom dead center (BDC) and the in-cylinder pressure increases. At Q point, the compression stroke starts and the in-cylinder pressure continues to increase. At R point, the combustion stroke starts. The in-cylinder pressure rapidly increases due to the combustion of the air-fuel mixture. At S point, the in-cylinder pressure reaches the maximum value. The piston is pushed down by the combustion of the air-fuel mixture and moves toward a BDC indicated by M point. This movement reduces the in-cylinder pressure. At T point, the exhaust valve opens and the exhaust stroke starts. During the exhaust stroke, the in-cylinder pressure further decreases.

The indicated mean effective pressure is calculated by dividing the area surrounded by the curve illustrated in FIG. 2 by the stroke volume of the piston.

In the following embodiments, a technique for calculating the indicated mean effective pressure will be described. It should be noted that the term “engine work” includes other indexes such as mean effective pressure, brake mean effective pressure, engine torque or the like which can be derived based on the indicated mean effective pressure determined by a technique according to the present invention.

The present invention is described referring to two preferred embodiments in the specification. The principles of the present invention are same in both embodiments. At first, referring to FIG. 3, the principles of the present invention will be described.

Figure 3:
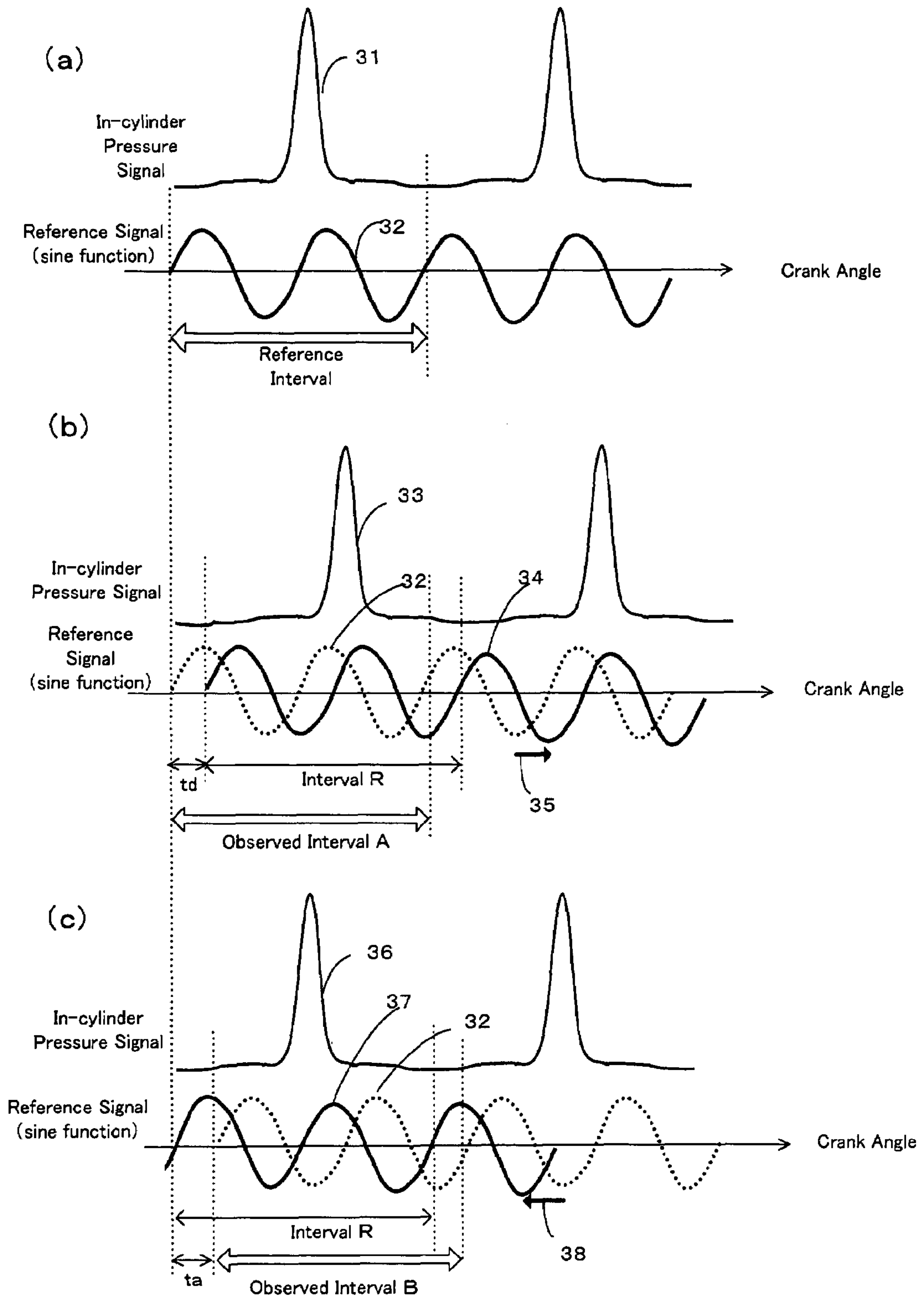
FIG. 3 A diagram showing a diagram for showing principles of this invention.

Referring to FIG. 3(*a*), an in-cylinder pressure signal 31 is shown. A reference interval and a reference signal 32 have been established. In this example, the reference interval starts at a top dead center (TDC) of an intake stroke and its length is equal to the length of one combustion cycle. Alternatively, the reference interval may be established to start at another timing. In this example, the reference signal is expressed as a first order sine function ($=\sin(2\pi/N)n$) having a value of zero at the start of the reference interval. The expression of the reference signal will be described in detail later.

For the reference interval, a correlation coefficient representing a correlation in phase between the in-cylinder pressure signal 31 and the reference signal 32 is determined (such correlation will be hereinafter referred to as a reference phase relation). The indicated mean effective pressure is calculated based on the correlation coefficient. The present invention establishes the reference phase relation for an in-cylinder pressure signal observed in a given observed interval. By establishing the reference phase relation, a correlation coefficient having the same value as the correlation coefficient determined for the reference interval can be determined for the observed interval. Accordingly, the indicated mean effective pressure can be more accurately calculated even when any part of the in-cylinder pressure signal is observed in the observed interval.

Referring to FIG. 3(*b*), a given observed interval A has been established. In the combustion cycle, a starting time of the observed interval A corresponds to a starting time of the reference interval. However, the in-cylinder pressure signal 33 in the observed interval A lags in phase by "td" from the in-cylinder pressure signal 31 in the reference interval.

In order to establish, in (b), a reference phase relation of (a), a reference signal same as the reference signal 32 that was established for the reference interval is established in the observed interval A. Specifically, a first order sine function (dotted line) having a value of zero at the starting time of the observed interval is established. Then, the established reference signal 32 is phase-shifted by the phase delay "td" in the direction indicated by the arrow 35. A reference signal 34 is obtained through the phase-shift operation. Referring to an interval R starting at a time to which the observed interval A was retarded by td, it is seen that the reference phase relation as shown in (a) is established in the interval R. By establishing such a reference phase relation, a correlation in phase between the in-cylinder pressure signal 33 and the reference signal 34 for the observed interval A is the same as the correlation in phase between the in-cylinder pressure signal 31 and the reference signal 32 for the reference interval. Therefore, the correlation coefficient between the in-cylinder pressure signal 33 and the reference signal 34 for the observed interval A has the same value as the correlation coefficient determined for the reference interval.

Thus, when there is a phase delay in the in-cylinder pressure signal, a phase of the reference signal established in the observed interval is retarded by the phase delay. By calculating a correlation coefficient between the retarded reference signal and the in-cylinder pressure signal observed in the observed interval, the indicated mean effective pressure can be more accurately calculated.

Referring to FIG. 3(*c*), an in-cylinder pressure signal 36 having the same phase as the in-cylinder pressure signal 31 of (a) is shown. A given observed interval B has been established. In the combustion cycle, a starting time of the observed interval B lags by "ta" behind the starting time of the reference interval.

In order to establish, in (c), a reference phase relation of (a), a reference signal same as the reference signal 32 that was established for the reference interval is established in the observed interval B. Specifically, a first order sine function (dotted line) having a value of zero at the starting time of the observed interval B is established. Then, a phase of the established reference signal 32 is advanced by "ta" in the direction indicated by the arrow 38 to determine a reference signal 37. Referring to an interval R starting at a time to which the observed interval B was advanced by ta, it is seen that the reference phase relation shown in (a) is established in the interval R. By establishing such a reference phase relation, a correlation in phase between the in-cylinder pressure signal 36 and the reference signal 37 for the observed interval B is the same as the correlation in phase between the in-cylinder pressure signal 31 and the reference signal 32 for the reference interval. Therefore, the correlation coefficient between the in-cylinder pressure signal 36 and the reference signal 37 for the observed interval B has the same value as the correlation coefficient determined for the reference interval.

Thus, when there is a delay in the starting time of the observed interval with respect to the reference interval, a phase of the reference signal established for the observed interval is advanced by the delay. By determining a correlation coefficient between the advanced reference signal and the in-cylinder pressure signal observed in the observed interval, the indicated mean effective pressure can be more accurately calculated.

Now, a case as shown in FIG. 3(*b*) will be described in detail as a first embodiment of the present invention and a case as shown in FIG. 3(*c*) will be described in detail as a second embodiment of the present invention.

Embodiment 1

The indicated mean effective pressure Pomi can be calculated by contour-integrating the PV curve as shown in FIG. 2. This calculation can be expressed as in the equation (1). An integral interval corresponds to one combustion cycle. It should be noted that the starting point of the integral interval can be set at an arbitrary time point.

The equation (2) is a discrete representation of the equation (1). Here, m in the equation (2) indicates a calculation cycle. Vs indicates a stroke volume of one cylinder. do indicates a rate of change in the volume of the cylinder. P indicates an in-cylinder pressure signal that can be determined based on the output of the in-cylinder pressure sensor 15 (FIG. 1) as described above.

$$Pmi = \frac{1}{Vs}\oint P dV \tag{1}$$

$$= \frac{1}{Vs}\sum_{m=0}^{n-1}\left(\frac{P_{m+1}+P_m}{2}\right)(V_{m+1}-V_m) \tag{2}$$

As shown by the equation (1), the indicated mean effective pressure Pmi is represented as a correlation coefficient between the in-cylinder pressure signal P and the volume change rate dV. Frequency components substantially constituting the volume change rate dV are limited (details will be described later). Thus, the indicated mean effective pressure Pmi can be determined by calculating the correlation coefficient between P and dV for only the frequency components constituting the volume change rate.

In order to frequency-resolve the volume change rate dV, the volume change rate dV is expanded in a Fourier-series, as shown by the equation (3). Here, t indicates time. T indicates the length of a rotation cycle of the crankshaft of the engine (referred to as a crank cycle hereinafter) and ω indicates the angular frequency. As to a 4-cycle engine, one cycle T corresponds to 360 degrees. k indicates the order of the engine rotation frequency.

$$dV(\omega t) = f(t) = \frac{V_{a0}}{2} + \sum_{k=1}^{\infty}(V_{ak}\cos k\omega t + V_{bk}\sin k\omega t) \tag{3}$$

$$V_{a0} = \frac{2}{T}\int_0^T f(t)\,dt$$

$$V_{ak} = \frac{2}{T}\int_0^T f(t)\cos k\omega t\,dt$$

-continued $$V_{bk}=\frac{2}{T}\int_0^T f(t)\sin k\omega t\,dt$$

The equation (4) is derived by applying the equation (3) to the equation (1). Here, θ=ωt.

$$\begin{aligned}Pmi&=\frac{1}{Vs}\oint PdV \quad (4)\\&=\frac{1}{Vs}\oint P\times\left(\frac{V_{a0}}{2}+\sum_{k=1}^{\infty}(V_{ak}\cos k\theta+V_{bk}\sin k\theta)\right)d\theta\\&=\frac{1}{Vs}\oint P\times\Big\{\frac{V_{a0}}{2}+V_{a1}\cos\theta+V_{a2}\cos 2\theta+V_{a3}\cos 3\theta+\\&\quad V_{a4}\cos 4\theta+\ldots+V_{b1}\sin\theta+V_{b2}\sin 2\theta+V_{b3}\sin 3\theta++\\&\quad V_{b4}\sin 4\theta+\ldots\Big\}d\theta\\&=\frac{1}{Vs}\oint P\frac{V_{a0}}{2}d\theta+\frac{V_{a1}}{Vs}\oint P\cos\theta d\theta+\\&\quad\frac{V_{a2}}{Vs}\oint P\cos 2\theta d\theta+\ldots+\frac{V_{b1}}{Vs}\oint P\sin\theta d\theta+\\&\quad\frac{V_{b2}}{Vs}\oint P\sin 2\theta d\theta+\ldots\end{aligned}$$

On the other hand, the in-cylinder pressure signal P is expanded into a Fourier series. The Fourier coefficients Pak and Pbk for the in-cylinder pressure signal can be expressed as shown by the equation (5). One cycle Tc of the in-cylinder pressure signal has a length equivalent to the length of one combustion cycle. As to a 4-cycle engine, the cycle Tc is twice the crank cycle T because one combustion cycle corresponds to 720 degrees crank angle. Therefore, θc in the equation (5) is θ/2 in the 4-cycle engine. kc indicates the order of the in-cylinder pressure signal's frequency.

$$\begin{aligned}Pak&=\frac{2}{Tc}\oint P\cos kc\theta c d\theta=\frac{2}{2T}\oint P\cos kc\frac{\theta}{2}d\theta \quad (5)\\Pbk&=\frac{2}{Tc}\oint P\sin kc\theta c d\theta=\frac{2}{2T}\oint P\sin kc\frac{\theta}{2}d\theta\end{aligned}$$

There are components of cos θ, cos 2θ, sin θ, sin 2θ, . . . in the equation (4). By assuming kc=2k in the equation (5), the Fourier coefficients Pak and Pbk for these components can be determined. That is, in order to calculate the indicated mean effective pressure Pmi for the 4-cycle engine, only the second, fourth, sixth, . . . order (kc=2, 4, 6, . . . ) frequency components are required for the Fourier coefficients Pak and Pbk of the in-cylinder pressure signal, among the first, second, third, . . . order (k=1, 2, 3, . . . ) frequency components for the Fourier coefficients Vak and Vbk of the volume change rate. Assuming kc=2k, the equation (5) can be expressed by the equation (6).

$$\begin{aligned}Pak&=\frac{2}{2T}\oint P\cos kc\frac{\theta}{2}d\theta=\frac{2}{2T}\oint P\cos k\theta d\theta \quad (6)\\Pbk&=\frac{2}{2T}\oint P\sin kc\frac{\theta}{2}d\theta=\frac{2}{2T}\oint P\sin k\theta d\theta\end{aligned}$$

By applying the equation (6) to the equation (4), the equation (7) is derived. Here, "Va0" in the equation (4) is almost zero (This reason will be described later).

$$Pmi=\frac{2T}{2Vs}\left(\sum_{k=1}^{\infty}P_{ak}V_{ak}+\sum_{k=1}^{\infty}P_{bk}V_{bk}\right) \quad (7)$$

The equation (7) includes the stroke volume Vs and the Fourier coefficients Vak and Vbk for the volume change rate dV. Therefore, even for an engine in which the stroke volume Vs and the waveform of the volume change rate dV with respect to the crank angle are variable, the indicated mean effective pressure Pmi can be more accurately calculated.

The equation (7) is for a 4-cycle engine. It would be obvious to those skilled in the art that the indicated mean effective pressure for a 2-cycle engine can be calculated in a similar way to the 4-cycle engine as described above. In the case of a 2-cycle engine, Tc=T and θc=θ.

The equation (6) for calculating the Fourier coefficients Pak and Pbk of the in-cylinder pressure is expressed in the continuous time system. The equation (6) is transformed into the discrete time system appropriate for digital processing, which is shown by the equation (8). Here, N indicates the number of times of sampling in each crank cycle T. The integral interval has a length equivalent to one combustion cycle. The number of times of sampling in each combustion cycle is 2N. n indicates a sampling number. Pn indicates an in-cylinder pressure in the n-th sampling.

$$\begin{aligned}Pak&=\frac{2}{2T}\oint P\cos k\theta d\theta \quad (8)\\&=\frac{2}{2T}\oint P\cos k\omega t dt\\&=\frac{2}{2T}\oint P\cos k\frac{2\pi}{T}t dt\\&=\frac{2}{2N}\sum_{n=1}^{2N}P_n\cos k\frac{2\pi}{N}n\end{aligned}$$

$$\begin{aligned}Pbk&=\frac{2}{2T}\oint P\sin k\theta d\theta\\&=\frac{2}{T}\oint P\sin k\omega t dt\\&=\frac{2}{2T}\oint P\sin k\frac{2\pi}{T}t dt\\&=\frac{2}{2N}\sum_{n=1}^{2N}P_n\sin k\frac{2\pi}{N}n\end{aligned}$$

By combining the equations (7) and (8), the equation (9) is obtained.

$$\begin{aligned}Pmi&=\frac{2N}{2Vs}\left(\sum_{k=1}^{\infty}P_{ak}V_{ak}+\sum_{k=1}^{\infty}P_{bk}V_{bk}\right) \quad (9)\\Pak&=\frac{2}{2N}\sum_{n=1}^{2N}P_n\cos k\frac{2\pi}{N}n\\Pbk&=\frac{2}{2N}\sum_{n=1}^{2N}P_n\sin k\frac{2\pi}{N}n\end{aligned}$$

In this embodiment, as shown by the equation (9), the Fourier coefficients Pak and Pbk of the in-cylinder pressure are calculated in real time in response to the detected in-cylinder pressure sample Pn. The stroke volume Vs and the Fourier coefficients Vak and Vbk of the volume change rate are pre-calculated and stored in the memory 1$c$ of the ECU 1 (FIG. 1).

The stroke volume Vs and the waveform of the volume change rate dV corresponding to the operating condition of the engine depends on the engine characteristics. Therefore, the stroke volume Vs and the volume change rate dV corresponding to the operating condition of the engine can be determined in advance through simulations or the like. In this embodiment, the stroke volume Vs and the Fourier coefficients Vak and Vbk corresponding to the operating condition of the engine are pre-stored in the memory 1$c$.

Alternatively, the Fourier coefficients Vak and Vbk may be calculated in real time in response to detecting the volume change rate. The equation (10) is for this calculation. Here, the integral interval is one crank cycle T. Vn indicates a volume change rate acquired in the n-th sampling, into which the detected volume change rate is substituted.

$$Vak = \frac{2}{T}\oint Vn\cos k\frac{2\pi}{T}t\,dt = \frac{2}{N}\sum_{n=1}^{N} V_n\cos k\frac{2\pi}{N}n \tag{10}$$

$$Vbk = \frac{2}{T}\oint Vn\sin k\frac{2\pi}{T}t\,dt = \frac{2}{N}\sum_{n=1}^{N} V_n\sin k\frac{2\pi}{N}n$$

The integral interval may have a length of 2 crank cycles that is equivalent to one combustion cycle. In this case, the equation (11) is used to calculate the Fourier coefficients of the volume change rate. The calculation result is the same as the equation (10).

$$Vak = \frac{2}{2T}\oint Vn\cos k\frac{2\pi}{T}t\,dt = \frac{2}{2N}\sum_{n=1}^{2N} V_n\cos k\frac{2\pi}{N}n \tag{11}$$

$$Vbk = \frac{2}{2T}\oint Vn\sin k\frac{2\pi}{T}t\,dt = \frac{2}{2N}\sum_{n=1}^{2N} V_n\sin k\frac{2\pi}{N}n$$

Now, the Fourier coefficient is considered in detail. As seen from the equation (8), each of the Fourier coefficients of the in-cylinder pressure can be considered as a correlation coefficient between the in-cylinder pressure signal P and a signal that consists of one of the frequency components obtained by frequency-resolving the volume change rate dV. Similarly, as seen from the equation (10), each of the Fourier coefficients of the volume change rate can be considered as a correlation coefficient between the volume change rate signal dV and a signal that consists of one of the frequency components obtained by frequency-resolving the volume change rate dV. For example, the Fourier coefficient Pa1 is a correlation coefficient between the in-cylinder pressure signal P and cos θ. The volume change rate Vb2 is a correlation coefficient between the volume change rate signal dV and sin 2θ.

Thus, each of the Fourier coefficients of the in-cylinder pressure indicates an in-cylinder pressure signal extracted at the corresponding frequency component. Each of the Fourier coefficients of the volume change rate indicates a volume change rate signal extracted at the corresponding frequency component. As described above, because the frequency component(s) substantially constituting the volume change rate dV are limited, the indicated mean effective pressure Pmi can be calculated by using the in-cylinder pressure signal and the volume change rate signal that are extracted only at such limited frequency component(s).

In this embodiment, the Fourier series expansion is used to extract the in-cylinder pressure signal and the volume change rate signal at frequency components substantially constituting the volume change rate. However, this extraction may be implemented by using another technique.

Figure 4:
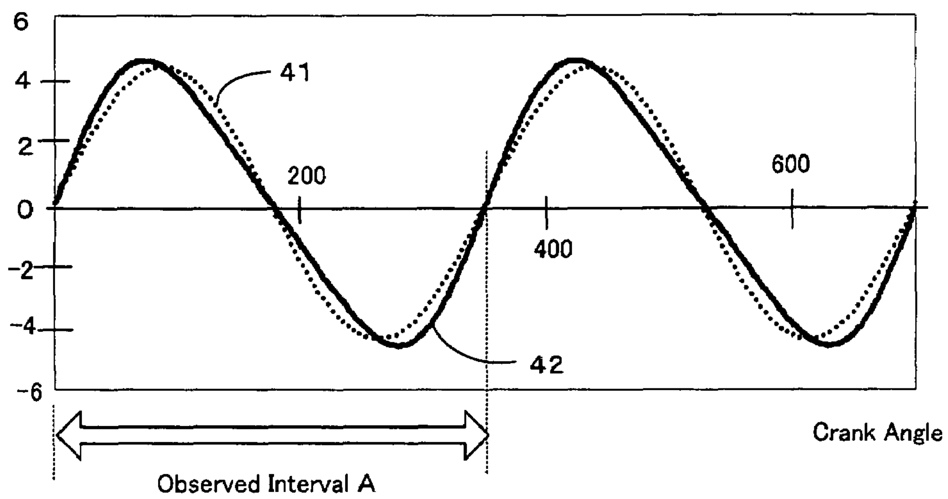
FIG. 4 A diagram showing a volume change rate and a result of an FFT analysis on the volume change rate in accordance with one embodiment of the present invention.
Figure 4:
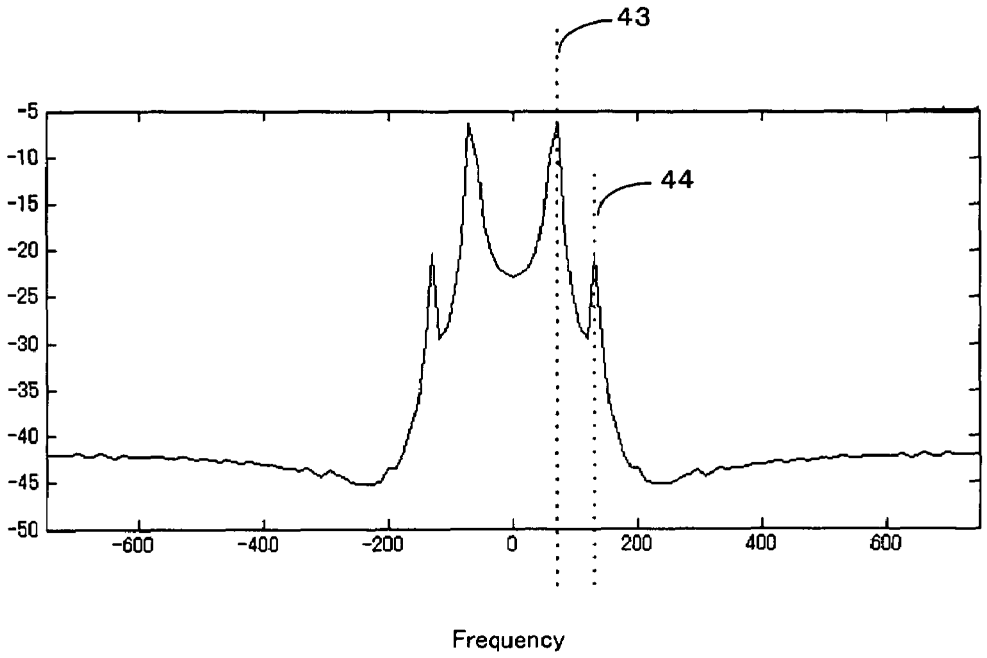
Figure 5:
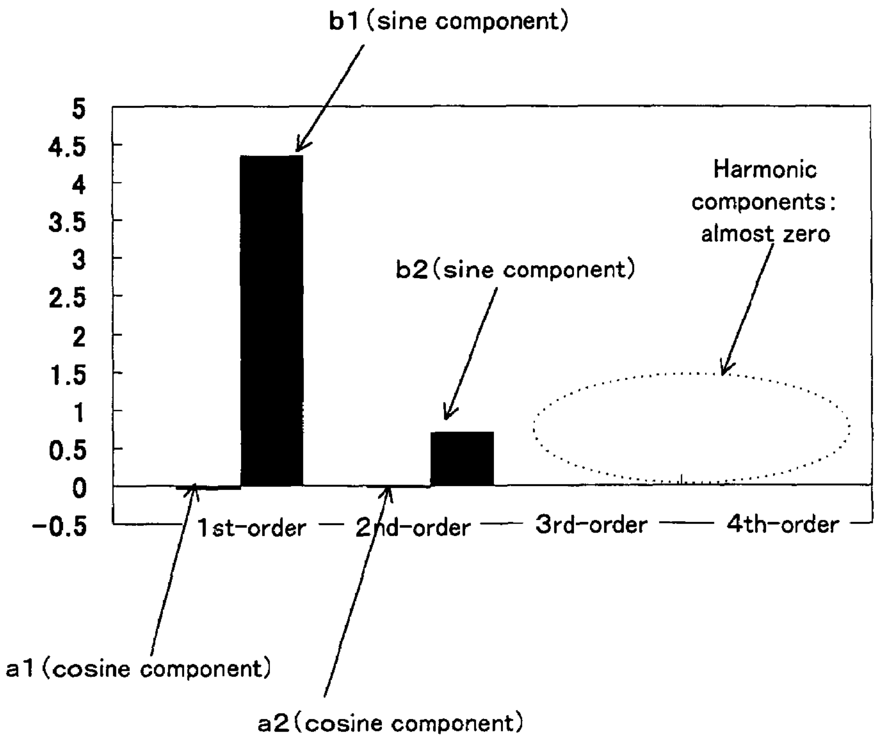
FIG. 5 A diagram showing a value of each order Fourier coefficient in accordance with one embodiment of the present invention.
Figure 6:
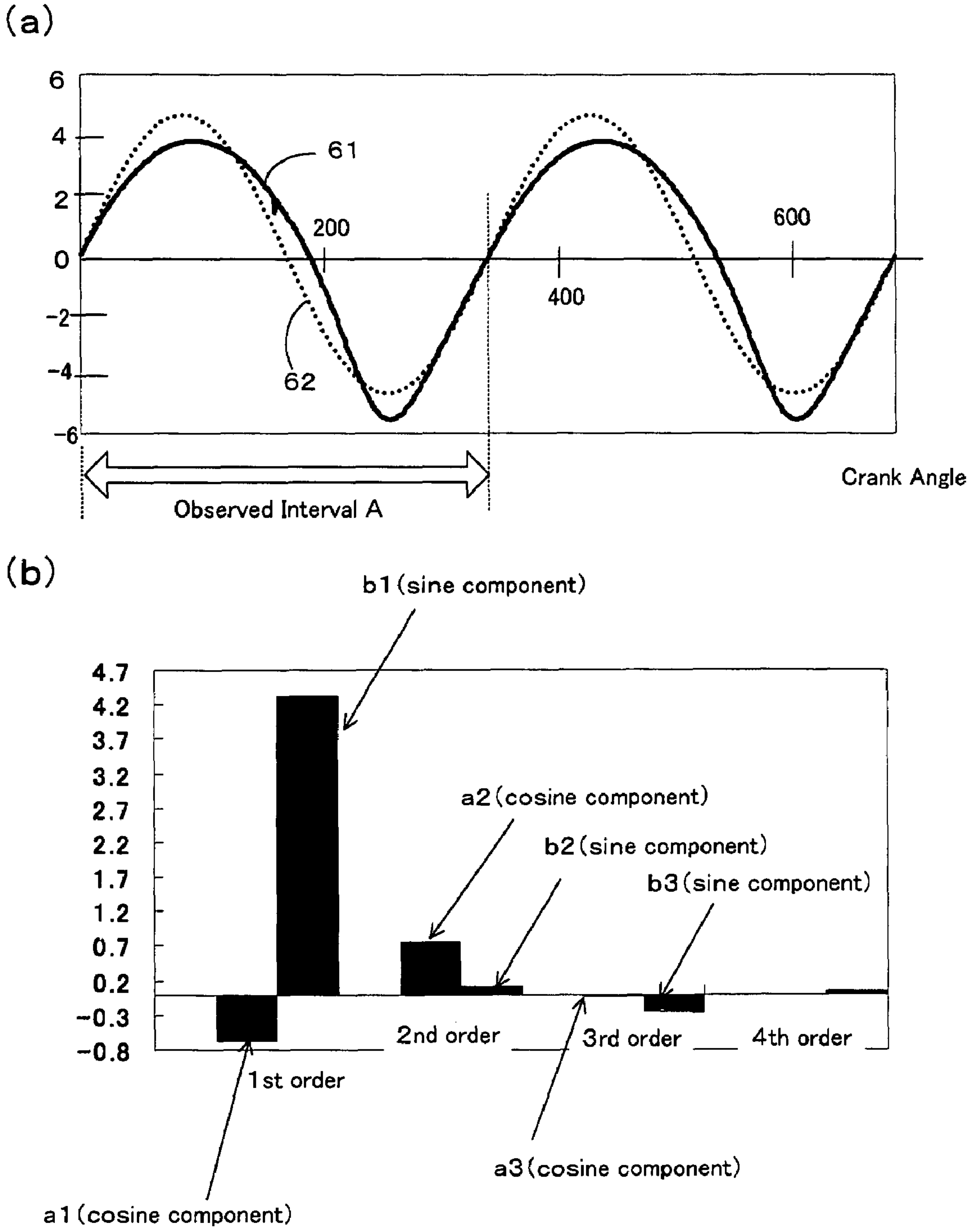
FIG. 6 A diagram showing a waveform of a volume change rate and desired components in accordance with one embodiment of the present invention.

Referring to FIGS. 4 through 6, the equation (9) will be studied. FIG. 4(*a*) shows a waveform 41 of the volume change rate dV with respect to a crank angle for a general engine in which the waveform of the volume change rate dV with respect to the crank angle is constant (in other words, the stroke volume is constant and hence there is no variation in the behavior of the volume change rate dV). A waveform 42 of a sine function having the same cycle as the volume change rate dV is also shown. The amplitude depends on the magnitude of the stroke volume. In this example, the observed interval A for Fourier coefficients is one combustion cycle starting from the TDC (top dead center) of the intake stroke. The sine function is established to have zero at the start of the observed interval A.

As seen from the figure, both waveforms are very similar to each other, which indicates that the volume change rate dV can be expressed by a sine function. The volume change rate dV has almost no offset or phase difference with respect to the sine function. Therefore, it is predicted that almost no direct current (DC) component and no cosine components appear in the frequency components of the volume change rate.

FIG. 4(*b*) shows a result of an FFT analysis on the volume change rate dV of such an engine. Reference numeral 43 is a line indicating the first order frequency of the engine rotation and reference numeral 44 is a line indicating the second order frequency of the engine rotation. As seen from the analysis result, the volume change rate dV mainly has only the first and second order frequency components of the engine rotation.

FIG. 5(*a*) shows an example of the Fourier coefficients of the volume change rate dV that were actually calculated for the observed interval A shown in FIG. 4(*a*). FIG. 5(*b*) graphically shows the magnitude of each Fourier coefficient in FIG. 5(*a*). It is seen that the direct current component Va0 and the cosine components Vak (k=1, 2, . . . ) whose phase is shifted from the sine components are almost zero. It is also seen that the third and higher order harmonic frequency components (k≧3) are almost zero.

Thus, in an engine in which the waveform of the volume change rate does not change, the volume change rate dV mainly consists of sine components at the first and second order frequency components of the engine rotation. In other words, among the Fourier coefficients of the volume change rate dV, components other than the first and second order sine components can be ignored. Considering this, the equation (9) can be expressed as shown by the equation (12).

$$Pmi = \frac{2N}{2V_S}(P_{b1}V_{b1} + P_{b2}V_{b2}) \tag{12}$$

$$Pbk = \frac{2}{2N}\sum_{n=1}^{2N} P_n\sin k\frac{2\pi}{N}n$$

Some variable compression ratio mechanisms change the stroke volume depending on the operating condition of an engine and hence change the waveform of the volume change rate dV with respect to the crank angle. FIG. 6(*a*) shows a waveform 61 (solid line) of the volume change rate dV under a certain operating condition as an example when the variable compression ratio mechanism 26 shown in FIG. 1 has such characteristics. A waveform 62 of a sine function having the same cycle as the waveform 61 of the volume change rate dV is also shown. An observed interval A is set similarly to FIG. 4(*a*) and the sine function is established to have a value of zero at the start of the observed interval A.

The waveform 61 of the volume change rate dV is distorted as compared with the waveform 62 of the sine function. Therefore, it is predicted that the volume change rate dV includes not only sine components but also cosine components. FIG. 6(*b*) shows values of the Fourier coefficients for the components of the volume change rate dV shown in FIG. 6(*a*), which were actually calculated for the observed interval A. It is seen that the volume change rate dV can be expressed by the first and second order sine components and the first and second order cosine components. Therefore, the indicated mean effective pressure Pmi can be expressed as shown by the equation (13). A value corresponding to the detected operating condition of the engine is substituted into the stroke volume Vs in the equation (13).

$$Pmi = \frac{2N}{2Vs}(P_{a1}V_{a1} + P_{a2}V_{a2} + P_{b1}V_{b1} + P_{b2}V_{b2}) \tag{13}$$

$$Pak = \frac{2}{2N}\sum_{n=1}^{2N} P_n \cos k\frac{2\pi}{N}n$$

$$Pbk = \frac{2}{2N}\sum_{n=1}^{2N} P_n \sin k\frac{2\pi}{N}n$$

Thus, according to the above technique described referring to the embodiments, the Fourier coefficients of the volume change rate and the in-cylinder pressure do not need to be calculated for all of the components (namely, for all order sine/cosine components). It is sufficient to calculate the Fourier coefficients only for desired components, that is, preferably only for components required for calculating the indicated mean effective pressure with a desired accuracy. In the example of FIG. 4, only the Fourier coefficients Vb1 and Vb2 for the first and second order sine components of the volume change rate dV and the Fourier coefficients Pb1 and Pb2 for the first and second order sine components of the in-cylinder pressure P need to be determined. In the example of FIG. 6, only the Fourier coefficients Vb1, Vb2, Va1 and Va2 for the first and second order sine and cosine components of the volume change rate dV and the Fourier coefficients Pb1, Pb2, Pa1 and Pa2 for the first and second order sine and cosine components of the in-cylinder pressure P need to be determined. Thus, by determining only the desired components, the number of Fourier coefficients to be calculated can be reduced, thereby reducing the calculation load for the indicated mean effective pressure.

Components desired for calculating the indicated mean effective pressure can be pre-determined through a simulation or the like. In one embodiment of the present invention, the Fourier coefficients Vak and Vbk for the desired components and the stroke volume Vs corresponding to the operating condition of the engine are pre-stored in the memory 1*c* (FIG. 1). In order to calculate the indicated mean effective pressure, the memory 1*c* is referred to extract the Fourier coefficients of the volume change rate for the desired components and the stroke volume. Thus, because the indicated mean effective pressure is calculated by using the values pre-calculated for the Fourier coefficients of the volume change rate and the stroke volume, the calculation load for the indicated mean effective pressure can be reduced.

According to the above-described technique, the indicated mean effective pressure is calculated by determining desired component(s) through the Fourier series expansion of the volume change rate in a given observed interval and then determining Fourier coefficients of the in-cylinder pressure and the Fourier coefficients of the volume change rate in accordance with the determined desired component(s). Therefore, the observed interval can be arbitrarily established as long as the calculation of the Fourier coefficients of the in-cylinder pressure and the volume change rate is performed for the established observed interval. Although the starting time of the observed interval A in the examples shown in FIGS. 4 and 6 is a TDC of an intake stroke, the observed interval may start at a time point other than the TDC of the intake stroke.

Figure 7:
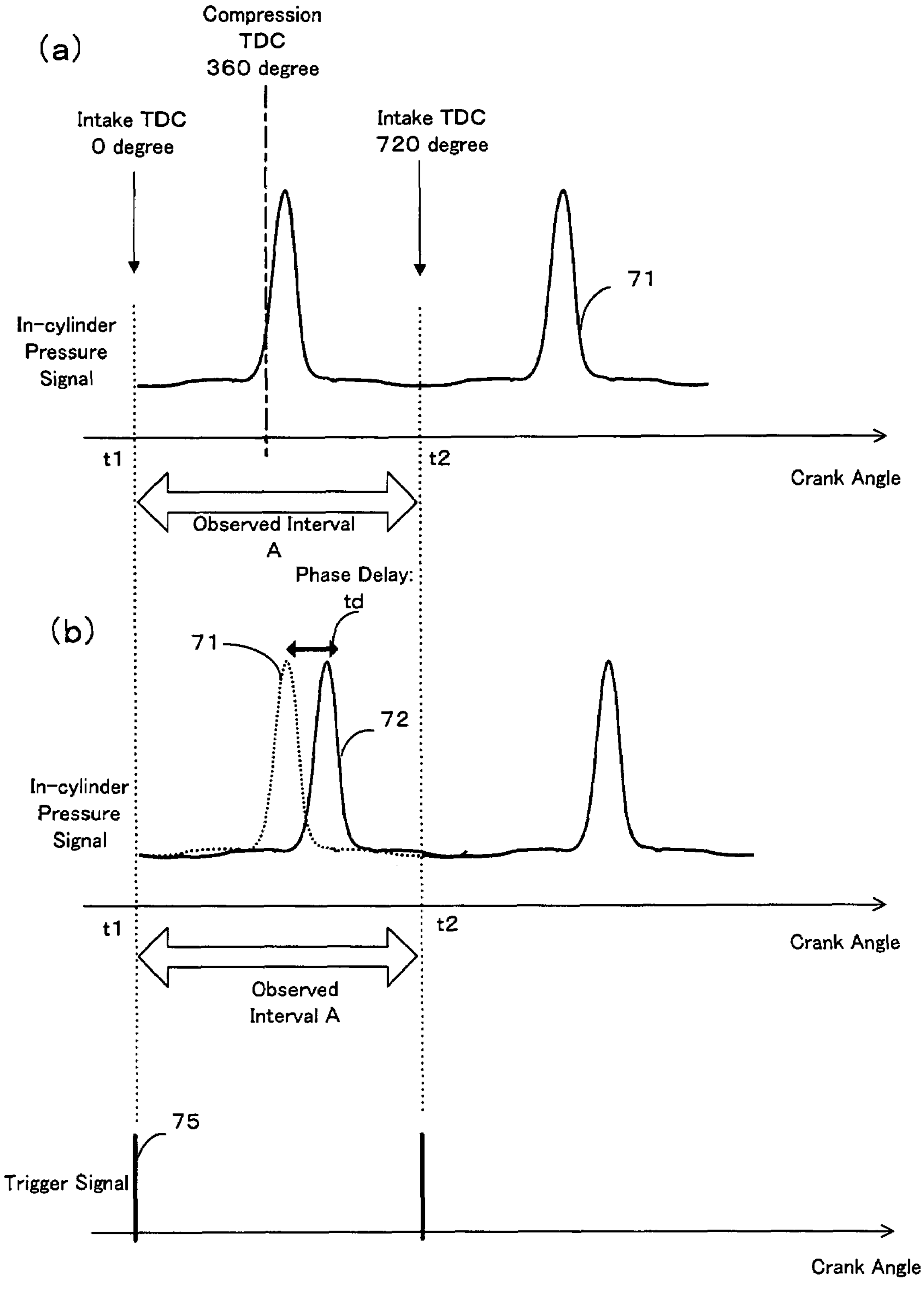
FIG. 7 A diagram for explaining that a Fourier coefficient changes depending on a phase delay in an in-cylinder pressure signal.

However, a phase delay may occur in the in-cylinder pressure signal observed in the observed interval. Referring to FIG. 7(*a*), an example of the in-cylinder pressure is shown. An observed interval A starts in response to a trigger signal 75 at t1. The indicated mean effective pressure Pmi is calculated for the observed interval A. The observed interval A has the same length as the reference interval. The length of the observed interval is typically equal to the length of one combustion cycle. FIG. 7(*b*) shows a case in which a phase delay occurs in the in-cylinder pressure signal. The phase of the in-cylinder pressure signal 72 lags by "td" with respect to the in-cylinder pressure signal 71 of (a).

Such a phase delay occurs, for example, due to the following reasons. The in-cylinder pressure sensor 15 as shown in FIG. 1 does not directly face the combustion chamber. A pressure receiving part of the in-cylinder pressure sensor faces a pressure receiving chamber provided in communication with the combustion chamber. A pressure change within the pressure receiving chamber has a dead time with respect to a pressure change within the combustion chamber. Because one combustion cycle is shorter in time as the engine rotational speed increases, the above dead time relatively increases with respect to one combustion cycle. Furthermore, the dead time changes depending on increase/decrease of the in-cylinder pressure (or, the engine load). Such dead time may cause a phase delay in the in-cylinder pressure.

Figure 8:
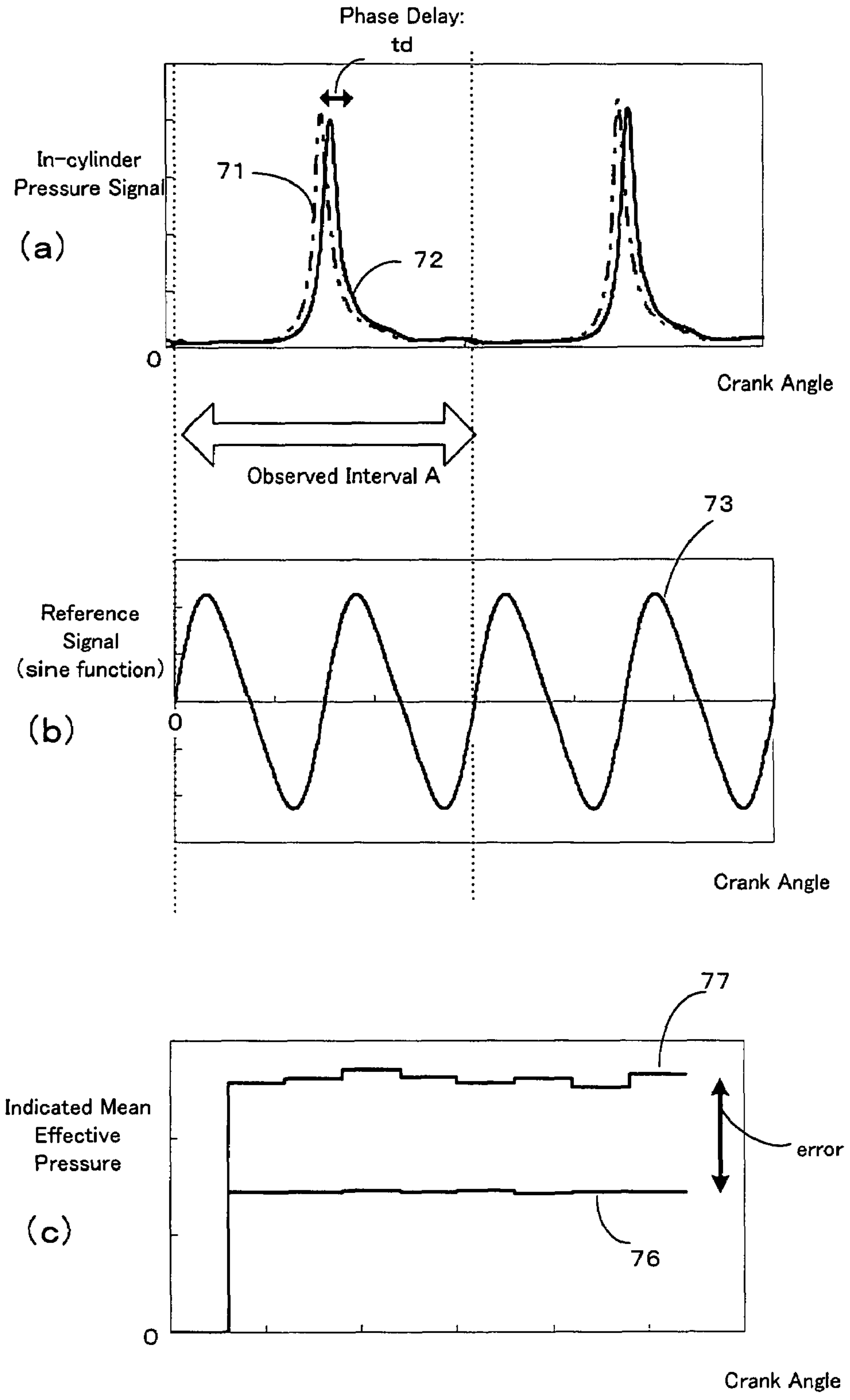
FIG. 8 A diagram showing an indicated mean effective pressure that includes an error due to a phase delay of an in-cylinder pressure signal.

Referring to FIG. 8(*a*), the in-cylinder pressure signal 71 and the in-cylinder pressure signal 72 having a phase delay td with respect to the signal 71 in FIG. 7(*b*) are shown. FIG. 8(*b*) shows the reference signal 73, which is represented by, in this example, a first order sine function (=sin(2π/N)n) having a value of zero at the start of the observed interval A. It should be noted that the first order sine function is included in the Fourier coefficient Pb1 as shown in the equation (9). It is seen that a correlation in phase between the in-cylinder pressure signal 72 and the sine function 73 is different from a correlation in phase between the in-cylinder pressure signal 71 and the sine function 73. As a result, the Fourier coefficient Pb1 that is calculated based on the in-cylinder pressure signal 72 and the sine function 73 has an error with respect to the Fourier coefficient Pb1 that is calculated based on the in-cylinder pressure signal 71 and the sine function 73.

Reference numeral 76 in FIG. 8(*c*) indicates an indicated mean effective pressure calculated by using the Fourier coefficients based on the in-cylinder pressure signal 71 and the sine function 73. The indicated mean effective pressure thus calculated is correct. Reference numeral 77 indicates an indicated mean effective pressure calculated by using the Fourier coefficients based on the in-cylinder pressure signal 72 and the sine function 72. The indicated mean effective pressure 77 is erroneous.

Thus, if an error is included in the Fourier coefficient of the in-cylinder pressure due to a phase delay in the in-cylinder pressure signal, a correlation between the Fourier coefficient of the in-cylinder pressure and the Fourier coefficient of the volume change rate varies, thereby causing an error in the indicated mean effective pressure.

Figure 9:
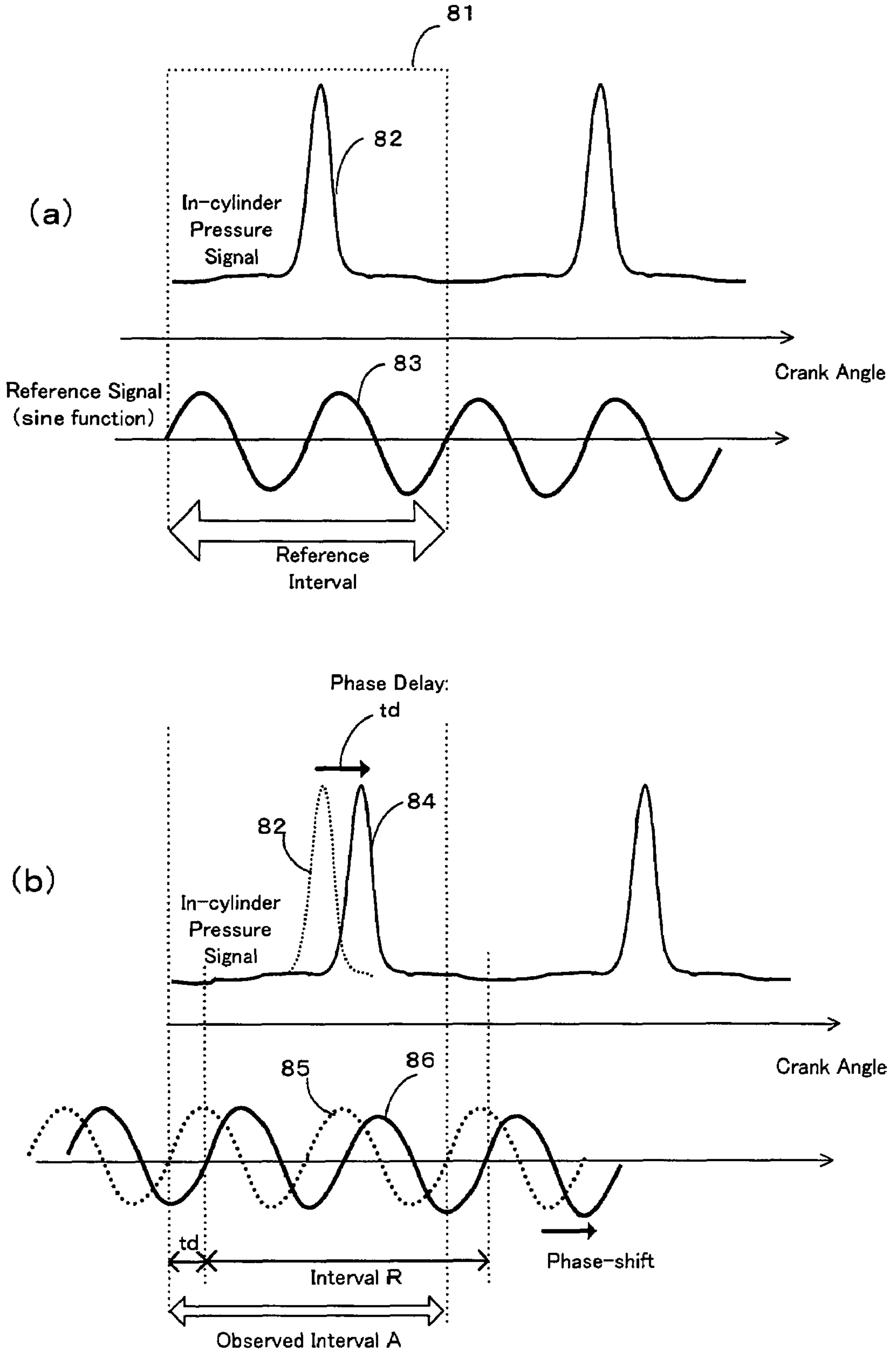
FIG. 9 A diagram showing a technique for shifting a phase of a reference signal in accordance with a phase delay of an in-cylinder pressure signal in accordance with a first embodiment of the present invention.

Referring to FIG. 9, a technique for preventing such an error will be described. FIG. 9(*a*) shows a reference phase relation between an in-cylinder pressure signal 82 and a reference signal 83 in the reference interval, as surrounded by a dotted line 81. The reference phase relation can be predetermined by observing the in-cylinder pressure signal over a predetermined reference interval. The reference phase relation is predetermined by using an in-cylinder pressure signal 82 when such observation is made and the first order sine function 83 (=sin(2π/N)n) having a value of zero at the start of the reference interval.

FIG. 9(*b*) shows an in-cylinder pressure signal 84 detected in a given observed interval A. The starting time of the observed interval A during the combustion cycle corresponds to the starting time of the reference interval during the combustion cycle (the starting point in this example is the top dead center of the intake stroke). As a result of occurrence of a phase delay in the in-cylinder pressure signal, the phase of the in-cylinder pressure signal 84 in the observed interval A lags by "td" with respect to the in-cylinder pressure signal 82 in the reference interval.

In FIG. 9(*b*), in order to establish the reference phase relation as shown in (a), a reference signal same as the reference signal constituting the reference phase relation is established in the observed interval A. In other words, a first order sine function 85 having a value of zero at the starting time of the observed interval is established in the observed interval A as a reference signal. A reference signal 86 is determined by retarding the reference signal 85 by td. Referring to an interval R starting at a time to which the reference signal 85 was retarded by td with respect to the observed interval A, it is seen that a reference phase relation as shown in (a) is established. Thus, the reference phase relation can be established for the detected in-cylinder pressure.

Because the reference phase relation has been established, the Fourier coefficients of the in-cylinder pressure 84 and the reference signal 86 for the observed interval A have the same values as the Fourier coefficients of the in-cylinder pressure signal 82 and the reference signal 83 for the reference interval. Accordingly, the Fourier coefficients for the reference interval can be determined by calculating the Fourier coefficients of the detected in-cylinder pressure 84 and the reference signal 86 for the observed interval A.

Thus, even when the in-cylinder pressure signal detected in the observed interval has a phase delay, the Fourier coefficients for the reference interval (that is, the Fourier coefficients including no error) can be determined from the observed interval. Because no error is included in the Fourier coefficients, the indicated mean effective pressure can be more accurately calculated.

In the figure, because the first order sine function is shown as a reference signal, the corresponding Fourier coefficient is Pb1. Another Fourier coefficient can be calculated similarly by phase-shifting the corresponding sine/cosine function.

Thus, when Fourier coefficients for the desired components are calculated, it is preferable that a reference signal consisting of one of the desired components be set in the reference interval. For example, when the Fourier coefficients Pb1 and Pb2 corresponding to the first and second order sine components are calculated, it is preferable that the reference signal consists of one of the first order sine function and the second order sine function. If an amount by which the phase is retarded is determined for one of the first and second order sine functions, both of the Fourier coefficients Pb1 and Pb2 can be calculated by phase-shifting the other of the sine functions in a similar way.

Alternatively, a reference signal to be set in the reference interval may consist of a component other than the desired components (in the example of FIG. 9, another other order sine function or cosine function). For example, considering a case where the desired component is the second order sine component and the first order cosine function (=cos(2π/N)n) is used as a reference signal, a second order sine function (=sin 2(2π/N)n) may be set in the observed interval. The phase of the second order sine function is retarded so that a reference phase relation, which is the same as the phase relation between the in-cylinder signal and the first order cosine function in the reference interval, is established for the in-cylinder pressure observed in the observed interval. Thus, the Fourier coefficient Pb2 can be calculated from the in-cylinder pressure and the second order sine function in the observed interval.

Furthermore, the reference signal may be set to have a value other than zero at the starting time of the reference interval. For example, when the reference signal represented by sin((2π/N)n·α) is set in the reference interval (α is a predetermined value), the reference signal has a phase difference of α with respect to the starting time of the reference interval. For the observed interval, the reference signal is set to have the same phase difference with respect to the starting time of the observed interval. Thus, the reference phase relation can be established.

When the magnitude of a phase delay of the in-cylinder pressure signal varies depending on the frequency, it is preferable that the magnitude of the phase delay be examined for each frequency and the reference signals (sine/cosine functions) corresponding to the respective frequencies are phase-shifted.

Figure 10:
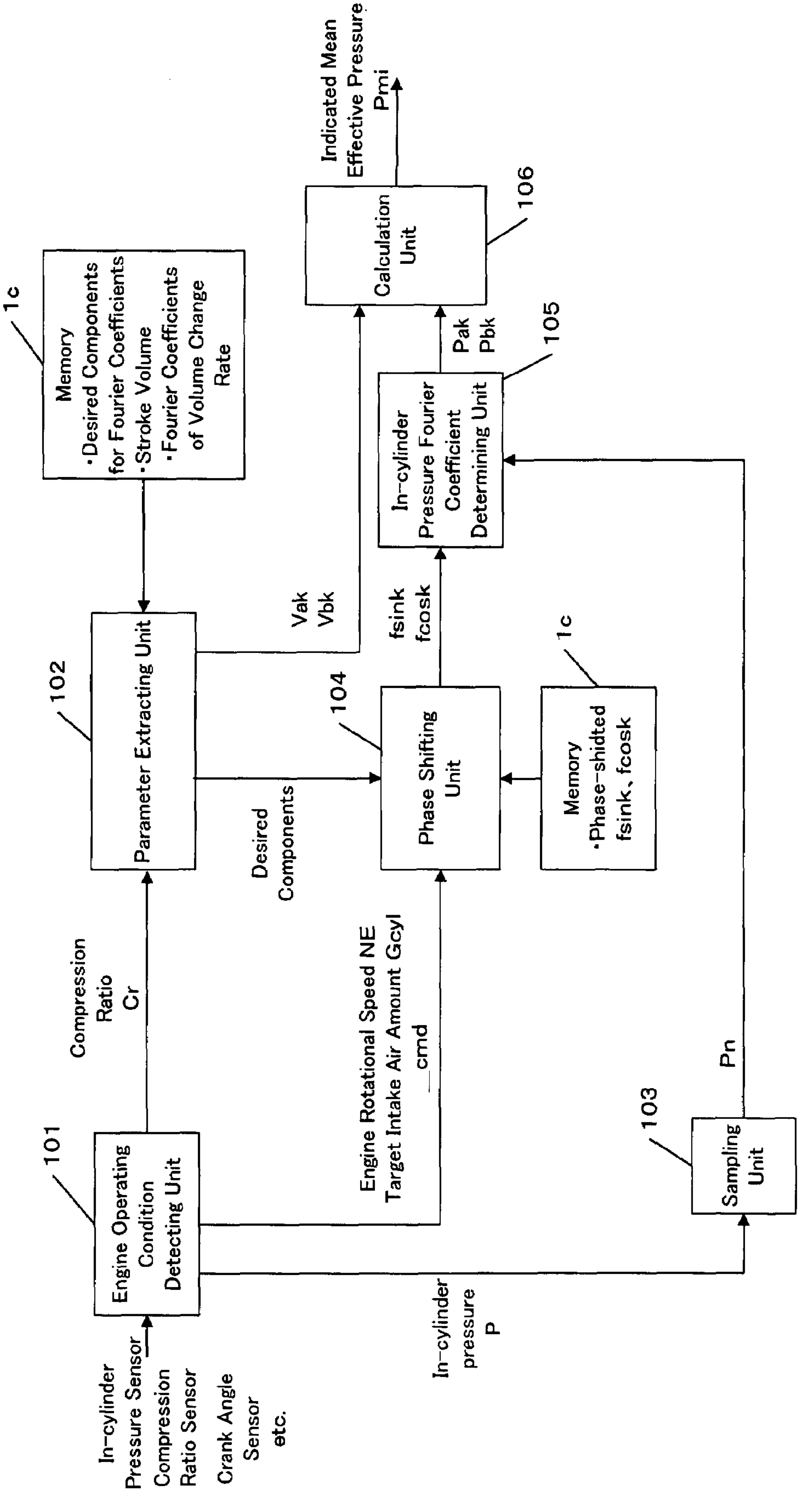
FIG. 10 A block diagram of an apparatus for calculating an indicated mean effective pressure in accordance with the first embodiment of the present invention.

FIG. 10 is a block diagram of an apparatus for calculating an indicated mean effective pressure in accordance with a first embodiment of the present invention. Functional blocks 101-105 can be implemented in the ECU 1. Typically, these functions are implemented by one or more computer programs stored in the ECU 1. Alternatively, these functions may be implemented with hardware, software, firmware or any combination thereof.

Figure 11:
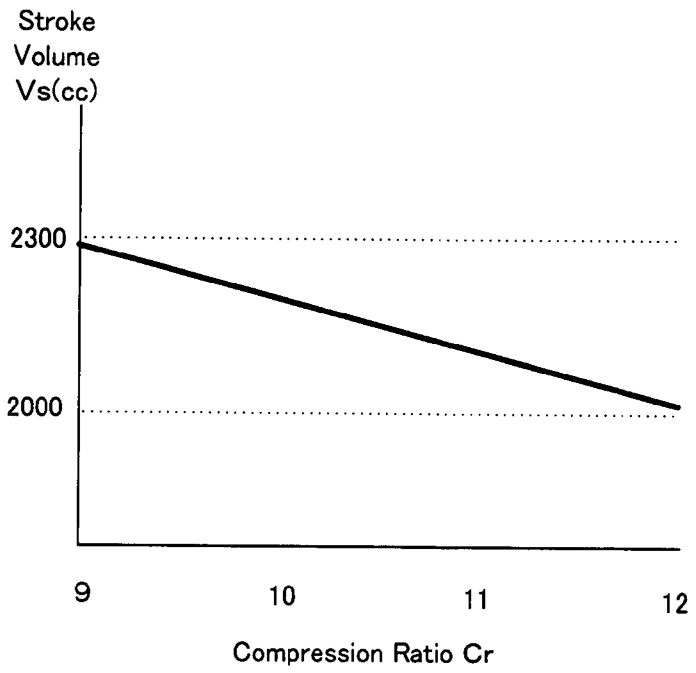
FIG. 11 A map showing a stroke volume and a Fourier coefficient for a volume change rate in accordance with an operating condition of an engine in accordance with the first embodiment of the present invention.
Figure 11:
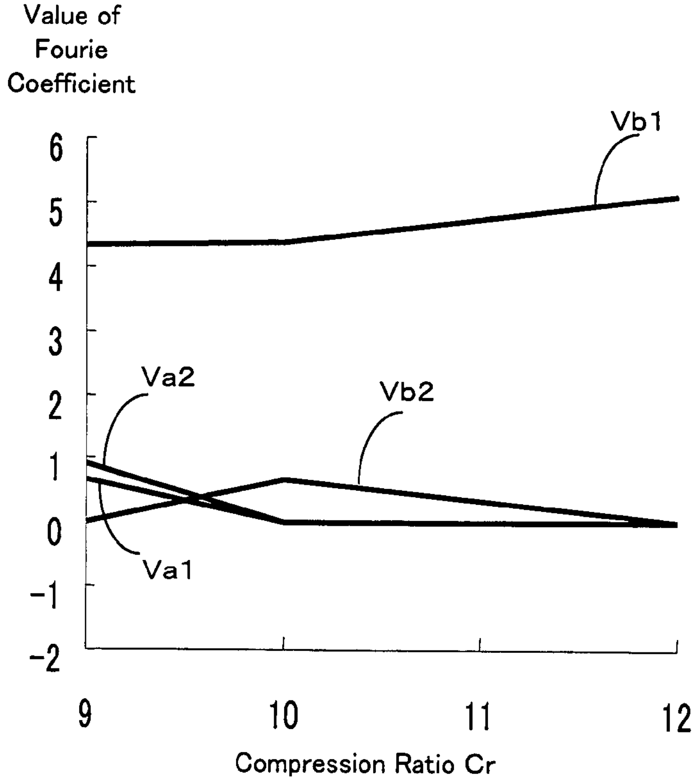

The memory 1*c* of the ECU 1 stores the stroke volume Vs and the volume change rate Fourier coefficients Vak and Vbk for desired components, all of which are pre-calculated corresponding to the compression ratio of the engine. FIG. 11(*a*) shows an example map defining the stroke volume Vs corresponding to the compression ratio Cr. FIG. 11(*b*) shows an example map defining the values of the Fourier coefficients Vak and Vbk for desired components corresponding to the compression ratio Cr.

An operating condition detecting unit 101 detects a current compression ratio Cr of the engine based on the output of the compression ratio sensor 27 (FIG. 1). A parameter extracting unit 102 refers to a map as shown in FIG. 11(*b*) based on the detected compression ratio Cr to determine desired components for the Fourier coefficients of the in-cylinder pressure and the volume change rate. In this example, only the Fourier coefficients Vb1, Vb2, Va1 and Va2 are defined in the map. Therefore, it is determined that the desired components are the first and second order sine components and the first and second order cosine components.

Because the desired components are the first and second order sine components and the first and second order cosine components, the indicated mean effective pressure is calculated in accordance with the above equation (13). For the purpose of convenience, the equation (13) is rewritten as shown by the equations (14) through (18).

$$Pmi = \frac{2N}{2Vs}\left(\sum_{k=1}^{2} P_{ak}V_{ak} + \sum_{k=1}^{2} P_{bk}V_{bk}\right) = \frac{2N}{2Vs}(Pa1\,Va1 + Pa2\,Va2 + Pb1\,Vb1 + Pb2\,Vb2) \tag{14}$$

$$Pa1 = \frac{2}{2N}\sum_{n=1}^{2N} P_n \cos\frac{2\pi}{N}n = \frac{2}{2N}\sum_{n=1}^{2N} P_n f\cos1(n) \tag{15}$$

$$Pa2 = \frac{2}{2N}\sum_{n=1}^{2N} P_n \cos2\frac{2\pi}{N}n = \frac{2}{2N}\sum_{n=1}^{2N} P_n f\cos2(n) \tag{16}$$

$$Pb1 = \frac{2}{2N}\sum_{n=1}^{2N} P_n \sin\frac{2\pi}{N}n = \frac{2}{2N}\sum_{n=1}^{2N} P_n f\sin1(n) \tag{17}$$

$$Pb2 = \frac{2}{2N}\sum_{n=1}^{2N} P_n \sin2\frac{2\pi}{N}n = \frac{2}{2N}\sum_{n=1}^{2N} P_n f\sin2(n) \tag{18}$$

In determining the desired components, the parameter extracting unit 102 extracts, for the determined desired components, the values of the volume change rate Fourier coefficients Vak and Vbk corresponding to the detected compression ratio. In this example, Va1, Va2, Vb1 and Vb2 are extracted.

The parameter extracting unit 102 further refers to a map as shown in FIG. 11(*a*) to extract the stroke volume Vs corresponding to the detected compression ratio Cr.

The operating condition detecting unit 101 further determines an in-cylinder pressure P based on the output of the in-cylinder pressure sensor 15 (FIG. 1). A sampling unit 103 samples the in-cylinder pressure P in a predetermined cycle to acquire each sample Pn of the in-cylinder pressure. In one example, sampling is performed at every 30 degrees crank angle. Therefore, 2N in the equation (9) takes a value of 24, which is derived by 720/30 (one combustion cycle corresponds to 720 degrees crank angle).

A phase shifting unit 104 receives the types of the desired components from the parameter extracting unit 102 to determine the amount of phase shifting for the desired components. In this example, as shown in the equations (15) through (18), reference signals to be set in the reference interval are a first order sine function f sin 1(n), a second order sine function f sin 2(n), a first order cosine function f cos 1(n) and a second order cosine function f cos 2(n). The amount of phase shifting is determined for each of the reference signals.

The amount of a phase delay of the in-cylinder pressure signal can be determined based on the operating condition of the engine. In this embodiment, the reference signals f sin 1, f sin 2, f cos 1 and f cos 2 phase-shifted by an amount corresponding to the operating condition of the engine are pre-stored as maps. The phase shifting unit 104 refers to the maps based on the detected target intake air amount Gcyl_cmd and the detected engine rotational speed NE to determine the phase-shifted f sin 1(n), f sin 2(n), f cos 1(n) and f cos 2(n). These maps are pre-stored in the memory c1 (FIG. 1).

Figure 12:
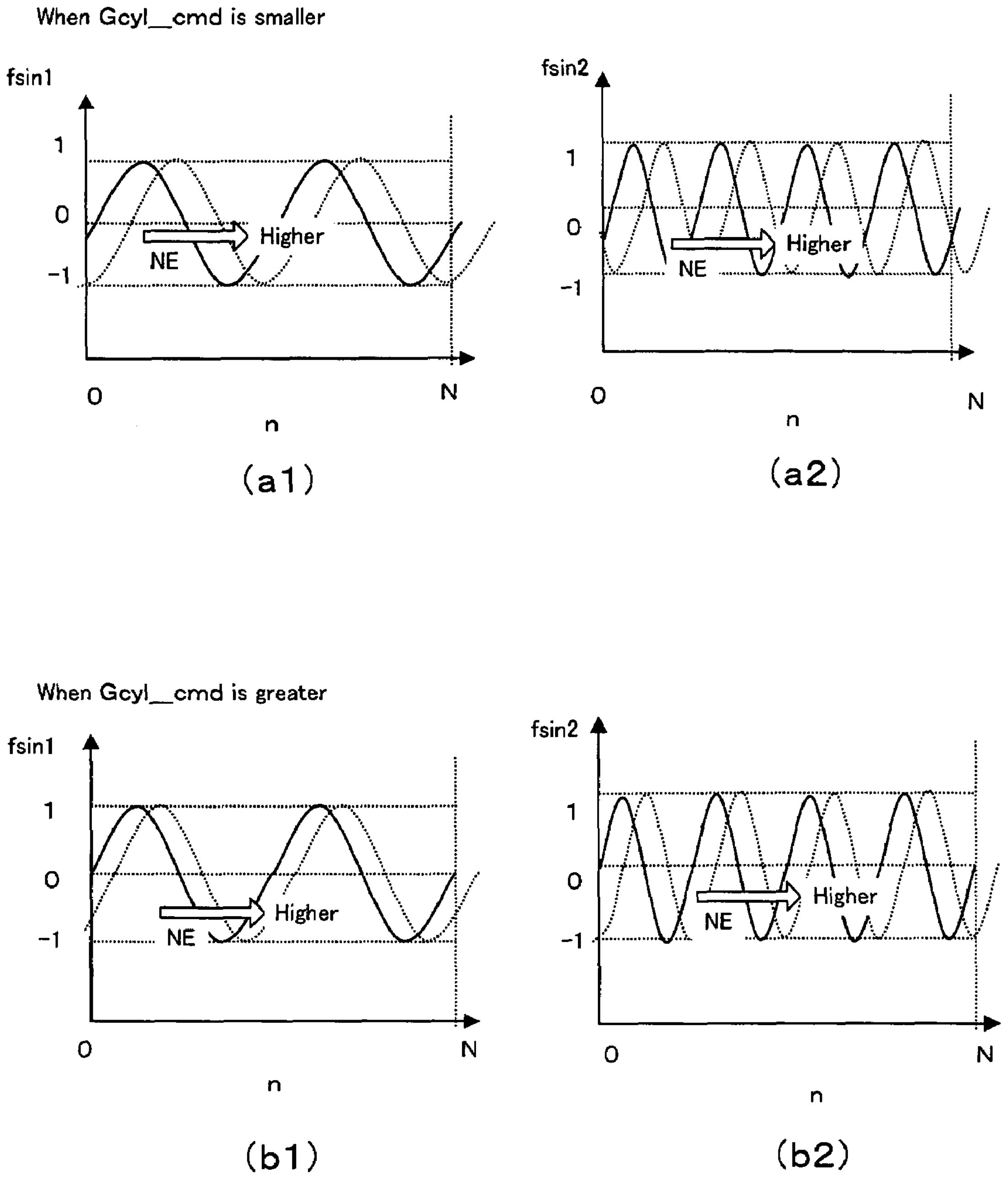
FIG. 12 A map showing a reference signal phase-shifted in accordance with an operating condition of an engine in accordance with the first embodiment of the present invention.

FIG. 12 shows an example of the maps for f sin 1 and f sin 2. (a1) and (a2) show f sin 1 and f sin 2 when the target intake amount Gcyl_cmd is less than a predetermined value. (b1) and (b2) show f sin 1 and f sin 2 when the target intake amount Gcyl_cmd is greater than the predetermined value. f cos 1 and f cos 2 are determined by advancing f sin 1 and f sin 2 by 90 degrees. The determination of f cos 1 and f cos 2 may be made through calculation or by defining maps.

Referring to the map of (a1) as an example, because a dead time of the in-cylinder pressure signal P increases as the engine rotational speed NE increases, f sin 1 is retarded with increase of the rotational speed NE. Further, because a dead time caused by the gas exchange into the pressure receiving chamber of the cylinder is shortened as the engine load (that is, the target intake air amount Gcyl_cmd) increases, f sin 1 is advanced with increase of the engine load. A similar map is defined for f sin 2.

An in-cylinder pressure Fourier coefficient determining unit 105 determines the Fourier coefficients Pak and Pbk based on the in-cylinder pressure sample Pn and the sine and cosine functions phase-shifted by the phase shifting unit 104. In this example, f sin 1(n), f sin 2(n), f cos 1(n) and f cos 2(n) phase-shifted by the phase shifting unit 104 are substituted into the equations (15) through (18), respectively, to determine the Fourier coefficients Pb1, Pb2, Pa1 and Pa2.

A calculation unit 106 uses the Fourier coefficients Pak, Pbk of the in-cylinder pressure, the Fourier coefficients Vak, Vbk of the volume change rate and the stroke volume Vs to calculate the indicated mean effective pressure Pmi. In this example, the indicated mean effective pressure Pmi is calculated in accordance with the equation (14).

Alternatively, the parameter extracting unit 102 may refer to maps as shown in FIGS. 11(*a*) and 11(*b*) based on a target compression ratio. However, because the variable compression ratio mechanism that is capable of changing the compression ratio may have a delay, it is preferable that the Fourier coefficients of the volume change rate be determined based on the actual compression ratio.

Figure 13:
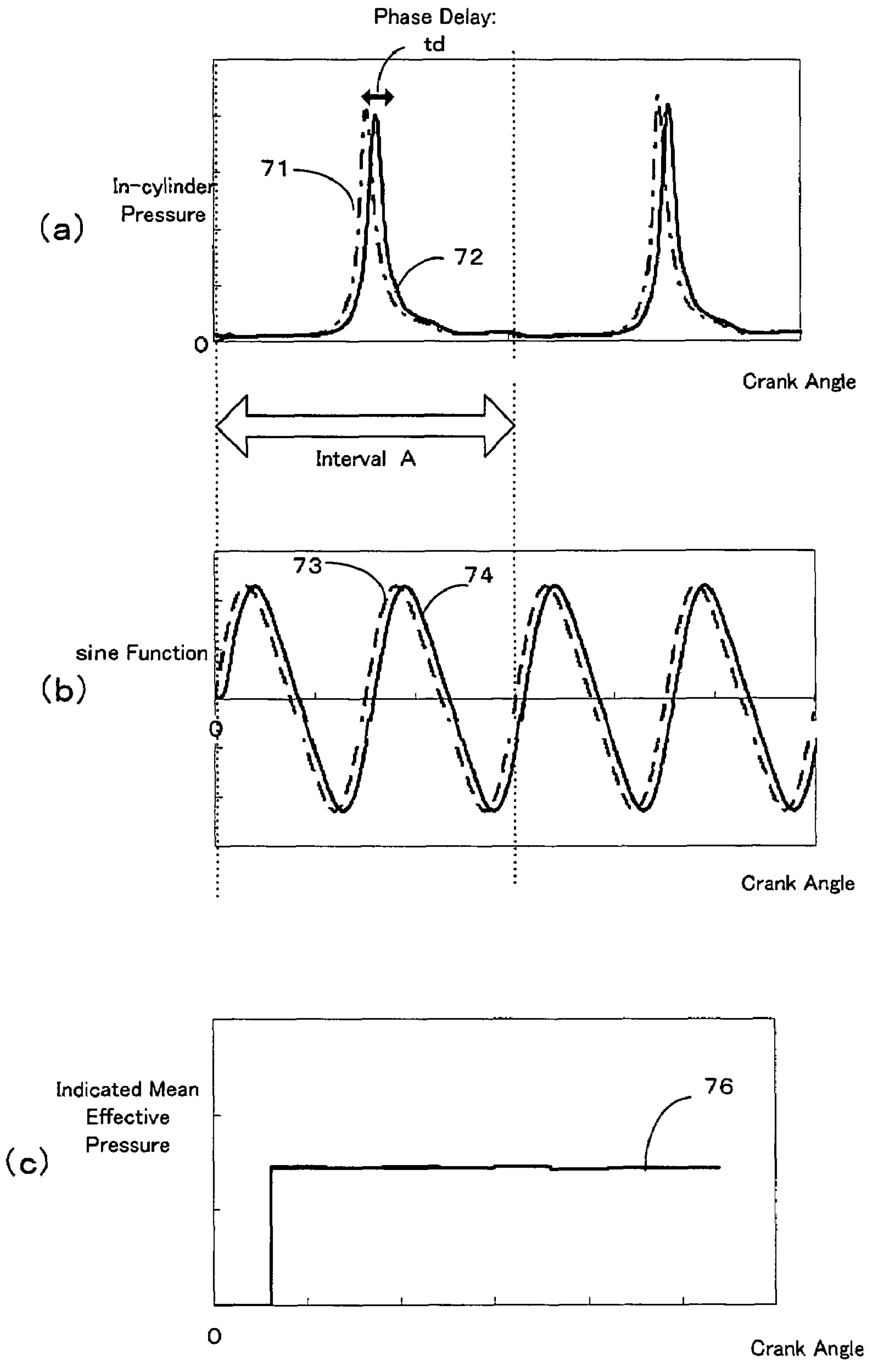
FIG. 13 A diagram showing a calculation result of an indicated mean effective pressure in accordance with the first embodiment of the present invention.

FIG. 13 shows a result of the calculation of the indicated mean effective pressure in accordance with the first embodiment. (a) is the same as shown in FIG. 8(*a*). Referring to (b), the sine function 74 has been determined by retarding the phase of the sine function 73 by td such that the phase relation between the in-cylinder pressure signal 71 and the sine function 73 is established for the in-cylinder pressure signal 72. Consequently, the values of the Fourier coefficients based on the in-cylinder pressure signal 72 and the sine function 74 are equal to the values of the Fourier coefficients based on the in-cylinder pressure signal 71 and the sine function 73. As shown in (c), the indicated mean effective pressure calculated by using the Fourier coefficients based on the in-cylinder pressure signal 72 and the sine function 74 is equal to the indicated mean effective pressure 76 calculated by using the Fourier coefficients based on the in-cylinder pressure signal 71 and the sine function 73. As a result, both signals overlap, which indicates there is no error.

Figure 14:
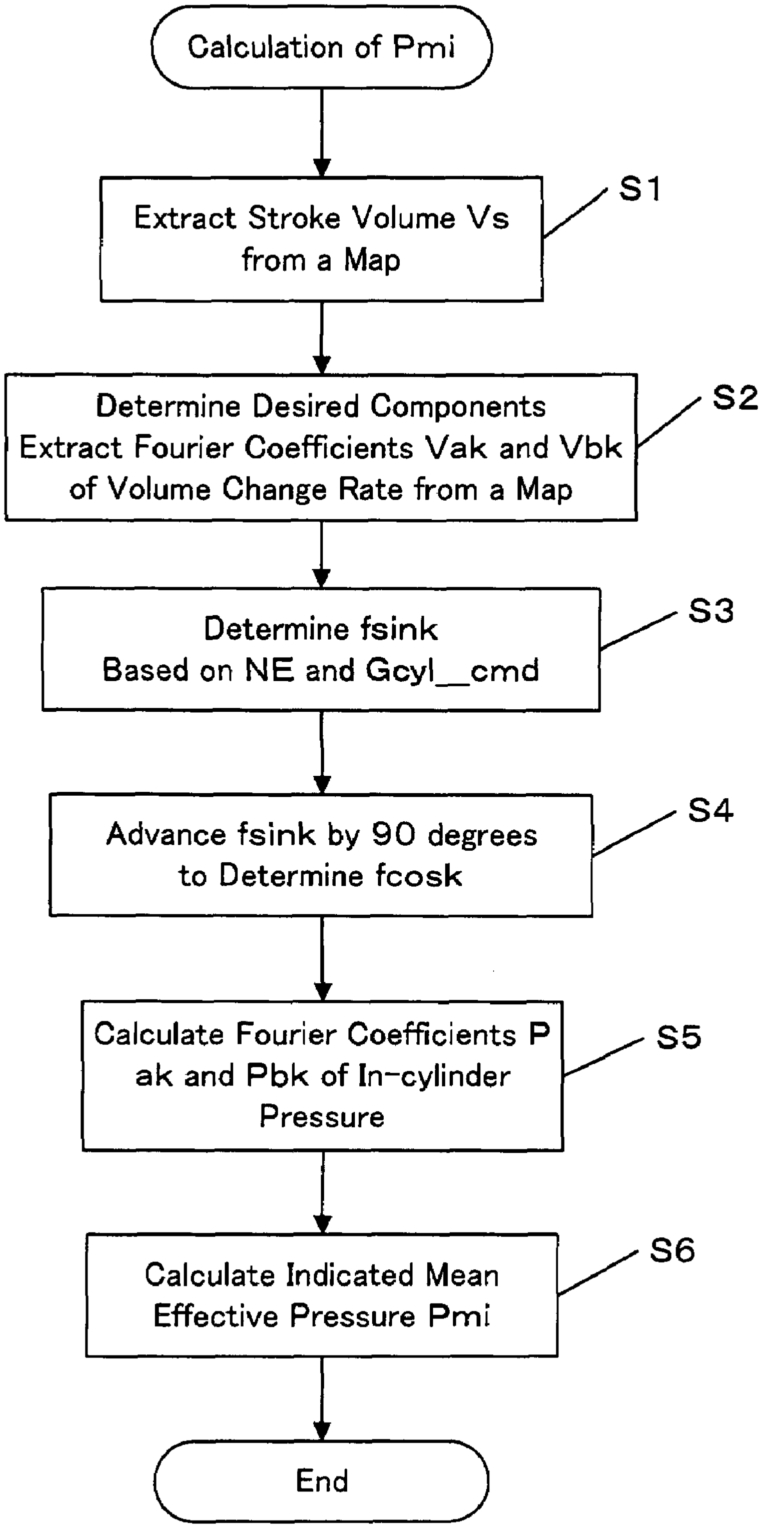
FIG. 14 A flowchart of a process for calculating an indicated mean effective pressure in accordance with the first embodiment of the present invention.

FIG. 14 is a flowchart of a process for calculating an indicated mean effective pressure in accordance with the first embodiment of the present invention. This process is typically performed by one or more programs stored in the memory 1*c* (FIG. 1). This process is activated, for example, in response to a predetermined trigger signal.

In this embodiment, the indicated mean effective pressure is calculated for one combustion cycle (observed interval) immediately before the activation of the process. During the observed interval, the in-cylinder pressure signal P is sampled. As a result, 2N samples Pn of the in-cylinder pressure are acquired.

In step S1, a map as shown in FIG. 11(*a*) is referred to based on a compression ratio Cr detected in the observed interval to extract the stroke volume Vs. In step S2, a map as shown in FIG. 11(*b*) is referred to based on the compression ratio Cr detected in the observed interval to determine the types of the desired components and extract the Fourier coefficients Vak and Vbk of the volume change rate for the desired components.

In step S3, a map as shown in FIG. 12 is referred to based on the engine rotational speed NE detected and the target intake air amount Gcyl_cmd determined for the observed interval, to determine the values of the phase-shifted sine function for the desired components (f sin k(n)) determined in step S2.

In step S4, the values of the phase-shifted cosine function for the desired components (f cos k(n)) are determined by advancing, by 90 degrees, the sine function determined in step S3.

In step S5, 2N samples Pn of the in-cylinder pressure acquired during the observed interval and 2N values of f sin k(n) and f cos k(n) determined for the observed interval are used to determine the Fourier coefficients Pak and Pbk of the in-cylinder pressure for the desired components.

In step S6, based on the stroke volume Vs and the Fourier coefficients Vak and Vbk of the volume change rate extracted in steps S1 and S2 and the Fourier coefficients Pak and Pbk of the in-cylinder pressure determined in step S5, the indicated mean effective pressure Pmi is calculated in accordance with the equation (9).

Embodiment 2

A second embodiment will be described. A technique for calculating an indicated mean effective pressure based on a first order component $c_1 \cos \phi_1$ and a second order component $c_2 \cos \phi_2$ of an in-cylinder pressure signal has been proposed as one example of a conventional approach, as shown in the equation (19) (see Japanese Patent Application Publication No. H8-20339). Because no parameter for the volume change rate is included in the equation, this technique can be used to calculate the indicated mean effective pressure for an engine in which the stroke volume does not change.

Here, λ is a value determined by "the length of a connecting rod of the engine/radius of the crankshaft of the engine". In the case of 4-cycle engine, A=π/2 and in the case of 2-cycle engine, A=π.

[Number 14]

$$Pmi = A\left(c_1\cos\phi_1 + \frac{1}{2\lambda}c_2\cos\phi_2\right) \tag{19}$$

c1 indicates the amplitude of a first order frequency component of the engine rotation in the in-cylinder pressure signal. ϕ1 indicates a phase difference of the in-cylinder pressure signal P with respect to the intake TDC of the first order frequency component of the engine rotation. c2 indicates the amplitude of a second order component of the engine rotation in the in-cylinder pressure signal. ϕ2 indicates a phase difference of the in-cylinder pressure signal with respect to the intake TDC of the second order frequency component of the engine rotation.

The first order component $c_1 \cos \phi_1$ is acquired at a crank angle of 90 degrees and the second order component $c_2 \cos \phi_2$ is acquired at a crank angle of 45 degrees. Thus, according to this technique, the first order and second order components need to be obtained at the exact angles (90 degrees and 45 degrees) from the top dead center TDC in the intake stroke.

An improved technique for the equation (19) has been proposed. According to the improved approach, the indicated mean effective pressure can be calculated based on Fourier coefficients b1 and b2 of the in-cylinder pressure as shown by the equation (20). The values of the Fourier coefficients b1 and b2 of the in-cylinder pressure significantly change depending on which part of the in-cylinder pressure is detected in an observed interval. Therefore, according to this technique, the observed interval needs to be started from the TDC of the intake stroke so as to accurately calculate the indicated mean effective pressure.

N indicates the number of sampling in the crank cycle. An integral interval is one combustion cycle (observed interval) that starts from the top dead center of the intake stroke. The number of sampling in the combustion cycle is 2N. n indicates a sampling number. Pn is a sample of the in-cylinder pressure acquired by the n-th sampling.

$$Pmi = A\left(b1 + \frac{1}{2\lambda}b2\right) \tag{20}$$

$$b1 = \frac{2}{2N}\sum_{n=1}^{2N} Pn\sin\frac{2\pi}{N}n = \frac{2}{2N}\sum_{n=1}^{2N} Pnf\sin 1 \tag{21}$$

$$b2 = \frac{2}{2N}\sum_{n=1}^{2N} Pn\sin 2\frac{2\pi}{N}n = \frac{2}{2N}\sum_{n=1}^{2N} Pnf\sin 2 \tag{22}$$

Figure 15:
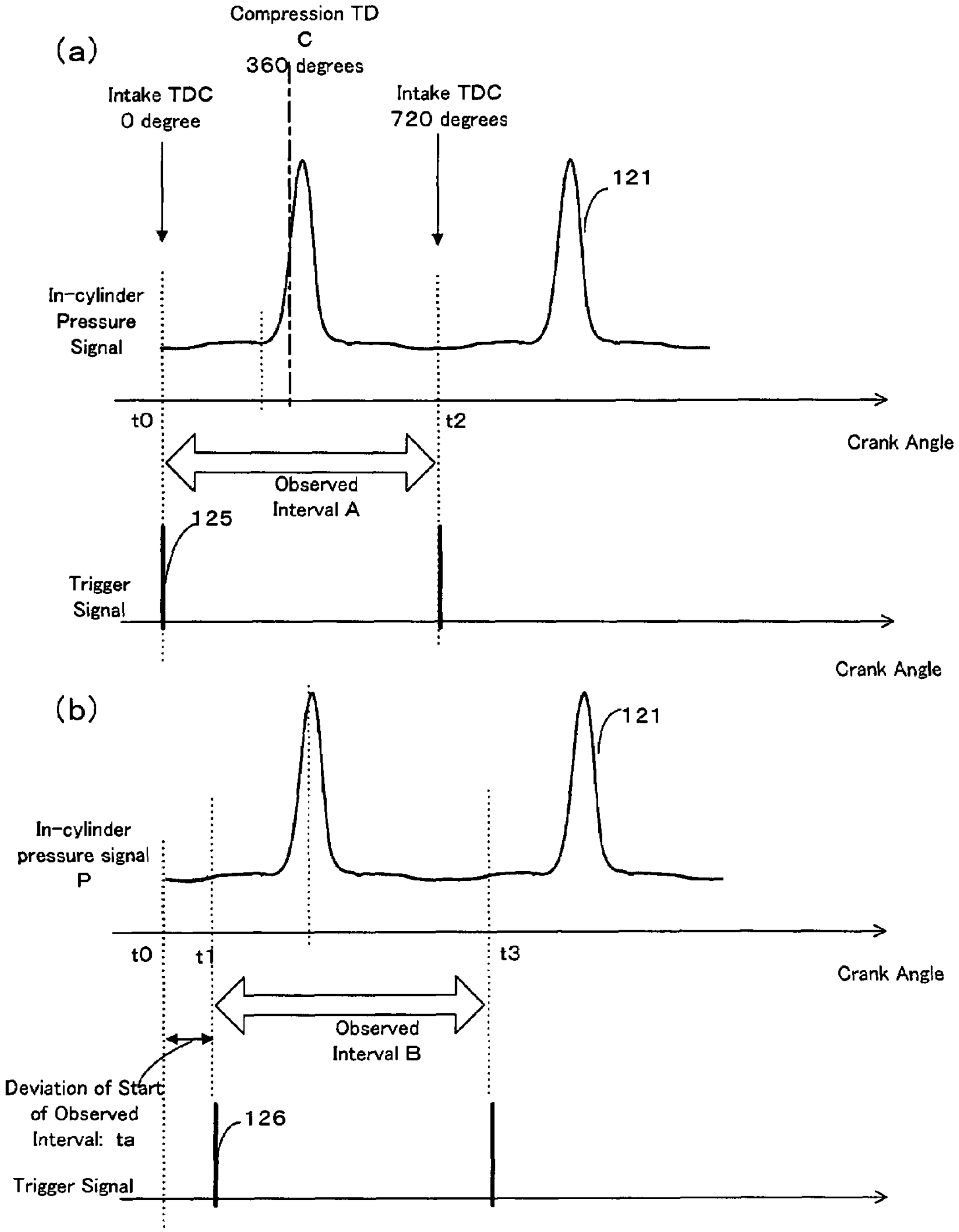
FIG. 15 A diagram for explaining that a Fourier coefficient changes depending on a deviation of a starting time of an observed interval.

The position of the observed interval may deviate. Referring to FIG. 15(*a*), the in-cylinder pressure signal 121 is shown. A trigger signal 125 is sent out at t0 that corresponds to the TDC of the intake stroke. An observed interval A starts in response to the trigger signal. The indicated mean effective pressure Pmi is calculated for the observed interval A.

FIG. 15(*b*) shows a case in which a trigger signal 126 is sent out with a delay "ta" with respect to the trigger signal 125. An observed interval B starts in response to the trigger signal 126 sent out at t1. The start of the observed interval B has a delay of "ta" from the start point of the observed interval A. The indicated mean effective pressure Pmi is calculated for the observed interval B. The length of the observed intervals A and B is the same as the length of the reference interval. The length of the observed intervals is typically equal to the length of one combustion cycle.

A first order sine function, for example, having a value of zero at the start of the observed interval A (as shown in FIG. 8(*b*)) is set as a reference signal. Due to the deviation of the start of the observed interval, a correlation in phase between the in-cylinder pressure signal 121 and the sine function for the observed interval B is different from a correlation in phase between the in-cylinder pressure signal 121 and the sine function for the observed interval A. As a result, the values of the Fourier coefficients determined for the observed interval B include an error with respect to the values of the Fourier coefficients determined for the observed interval A, which leads to an error in the calculated indicated mean effective pressure as shown in FIG. 8(*c*).

Figure 16:
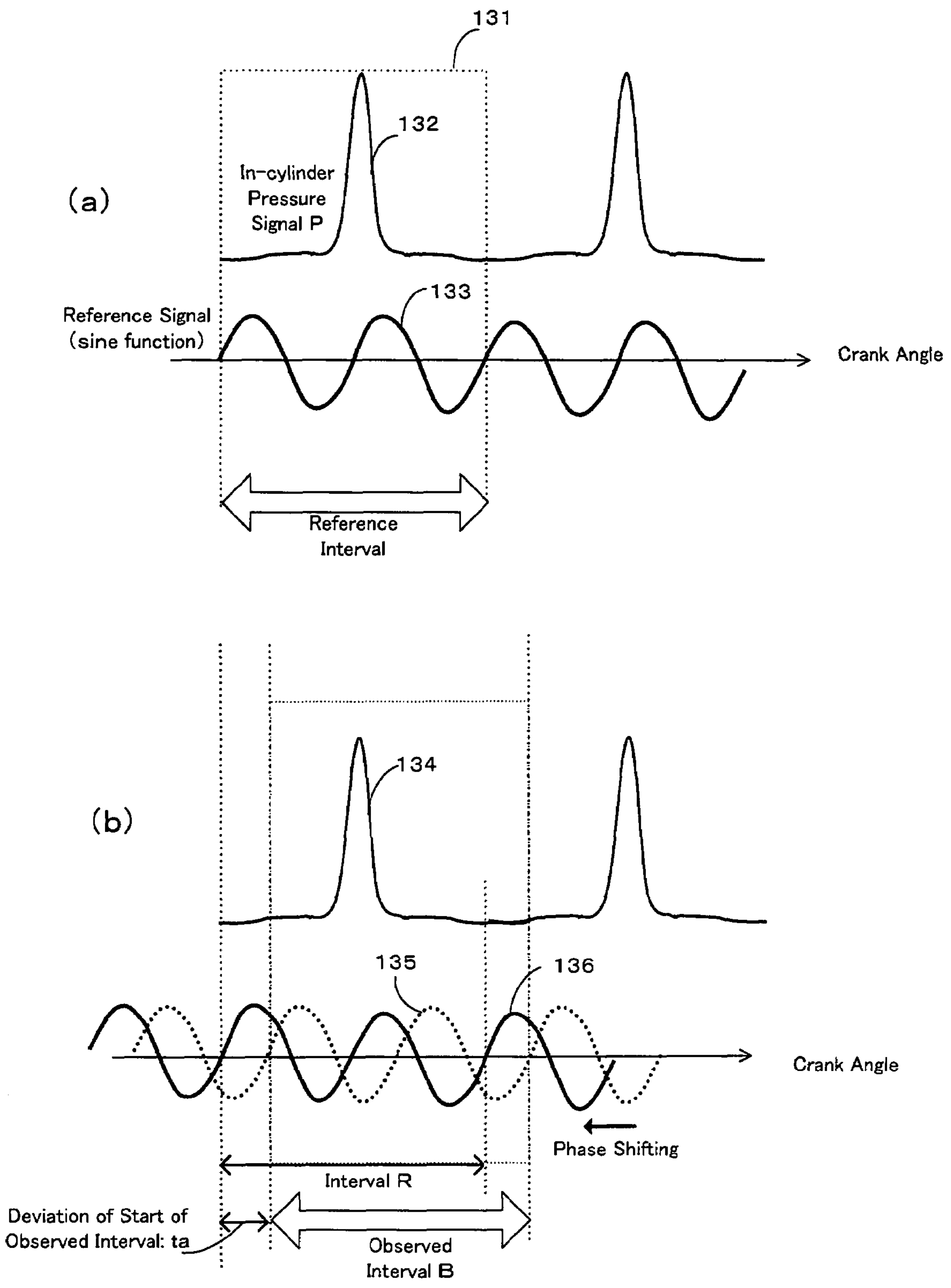
FIG. 16 A diagram showing a technique for shifting a phase of a reference signal in accordance with a delay of a starting time of an observed interval in accordance with a second embodiment of the present invention.

Referring to FIG. 16, a technique for preventing such an error will be described. FIG. 16(*a*) shows a reference phase relation between the in-cylinder pressure signal 132 and the reference signal 133 in the reference interval, as surrounded by the dotted line 131. This reference phase relation can be predetermined by observing the in-cylinder pressure signal for a predetermined reference interval and then using the observed in-cylinder pressure signal 132 and the first order sine function 133 (=sin (2π/N)n) having a value of zero at the start of the reference interval.

FIG. 16(*b*) shows the in-cylinder pressure signal 134 detected in a given observed interval B. The start of the observed interval B during the combustion cycle deviates by "ta" with respect to the start of the reference interval during the combustion cycle (in this example, the start of the reference interval is the top dead center of the intake stroke).

In (b), in order to establish a reference phase relation shown in (a), a reference signal same as the reference signal constituting the reference phase relation is set in the observed interval B. That is, a first order sine function 135 having a value of zero at the start of the observed interval B is set in the observed interval B as a reference signal. A reference signal 136 is determined by advancing the reference signal 135 by ta. Referring to an interval R that starts at a time point to which the reference signal 135 was advanced by ta with respect to the observed interval B, it is seen that a reference phase relation as shown in (a) is established. Thus, the reference phase relation can be established for the detected in-cylinder pressure.

Because the reference phase relation has been established, the Fourier coefficients of the in-cylinder pressure signal 134 and the reference signal 136 for the observed interval B have the same values as the Fourier coefficients of the in-cylinder pressure signal 132 and the reference signal 133 for the reference interval. Accordingly, the Fourier coefficients for the reference interval can be determined by calculating the Fourier coefficients of the detected internal cylinder pressure 134 and the reference signal 136 for the observed interval B.

Thus, even when the position of the observed interval deviates, the Fourier coefficients for the reference interval, that is, the Fourier coefficients including no error, can be determined from the observed interval. Because no error is included in the Fourier coefficients, the indicated mean effective pressure can be more accurately calculated.

In the figure, because the first order sine function is shown as a reference signal, the corresponding Fourier coefficient is Pb1. The Fourier coefficient Pb2 can be determined by shifting the second order sine function.

As described above referring to the first embodiment, alternatively, a cosine function or another order of sine function may be used as the reference signal to be set in the reference interval. Further, the reference signal may be set in such a manner as to have a value other than zero at the start of the reference interval.

Figure 17:
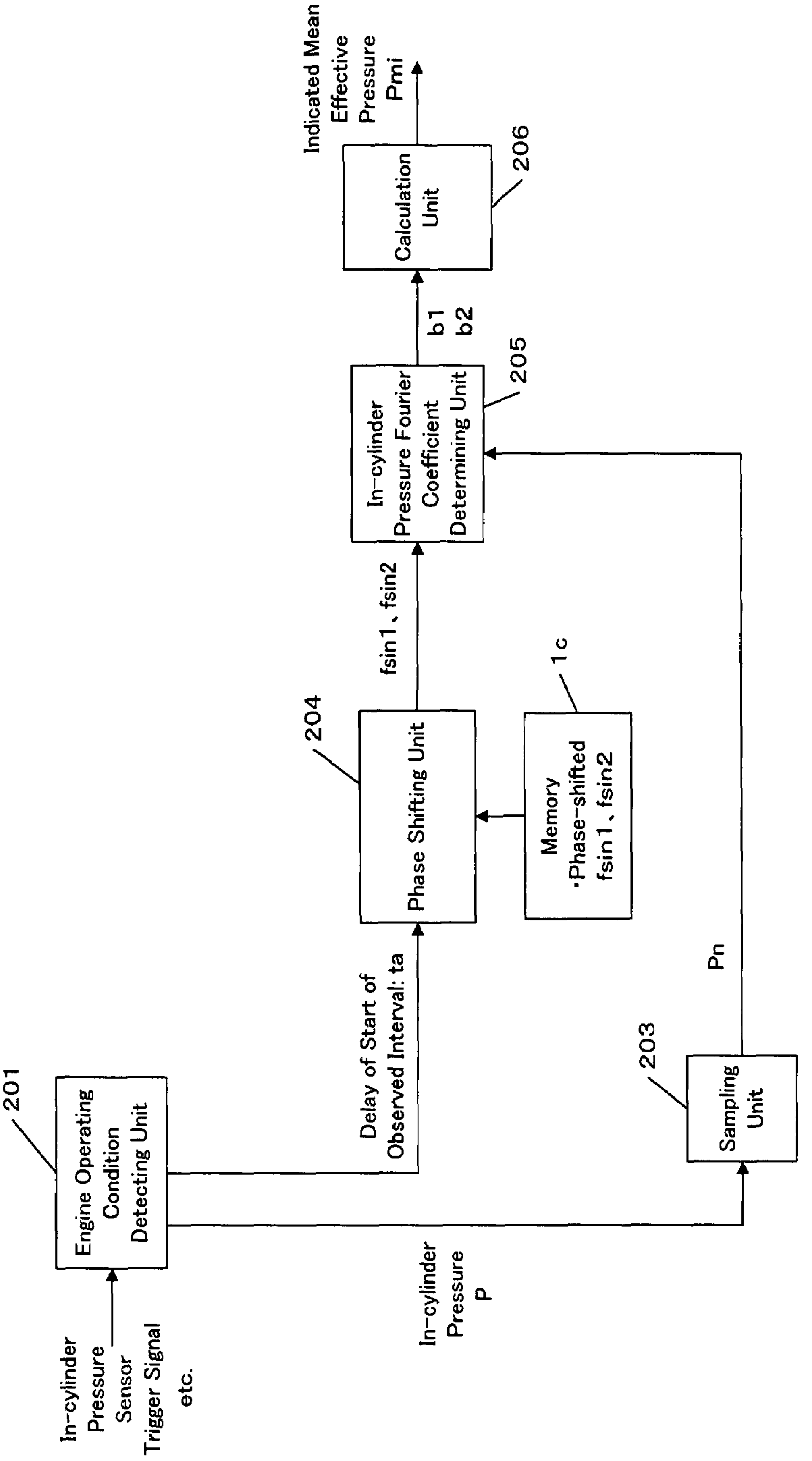
FIG. 17 A block diagram of an apparatus for calculating an indicated mean effective pressure in accordance with the second embodiment of the present invention.

FIG. 17 is a block diagram of an apparatus for calculating an indicated mean effective pressure in accordance with the second embodiment. Functional blocks 201 through 205 may be implemented in the ECU 1. Typically, these functions are implemented by one or more computer programs stored in the ECU 1. Alternatively, these functions may be implemented with hardware, software, firmware or any combination thereof. An operating condition detecting unit 201 determines an in-cylinder pressure P based on the output of the pressure sensor 15 (FIG. 1). A sampling unit 203 samples the in-cylinder pressure in a predetermined sampling cycle to acquire each sample Pn of the in-cylinder pressure.

The operating condition detecting unit 201 further detects a delay "ta" of the start of the observed interval. The start of the reference interval during the combustion cycle is predetermined (for example, the TDC of the intake stroke). The operating condition detecting unit 201 detects a trigger signal by which the observed interval is started to detect a relative difference between the trigger signal and the start of the reference interval during the combustion cycle. This relative difference corresponds to the delay "ta" of the start of the observed interval.

A phase shifting unit 204 determines the amount of phase shifting in accordance with the engine operating condition. In this example, as shown in the equations (21) and (22), reference signals to be set in the reference interval are a first order sine function f sin 1(n) and a second order sine function f sin 2(n). The amount of phase shifting is determined for each of the reference signals.

In this embodiment, the reference signals f sin 1 and f sin 2 that are determined by shifting the phase of the reference signals by an amount corresponding to the operating condition of the engine are pre-stored in the memory 1*c* as maps. The phase shifting unit 204 receives a delay "ta" of the start of the observed interval from the operating condition detecting unit 201 and refers to the maps based on the delay "ta" to determine the phase-shifted f sin 1(n) and f sin 2(n).

Figure 18:
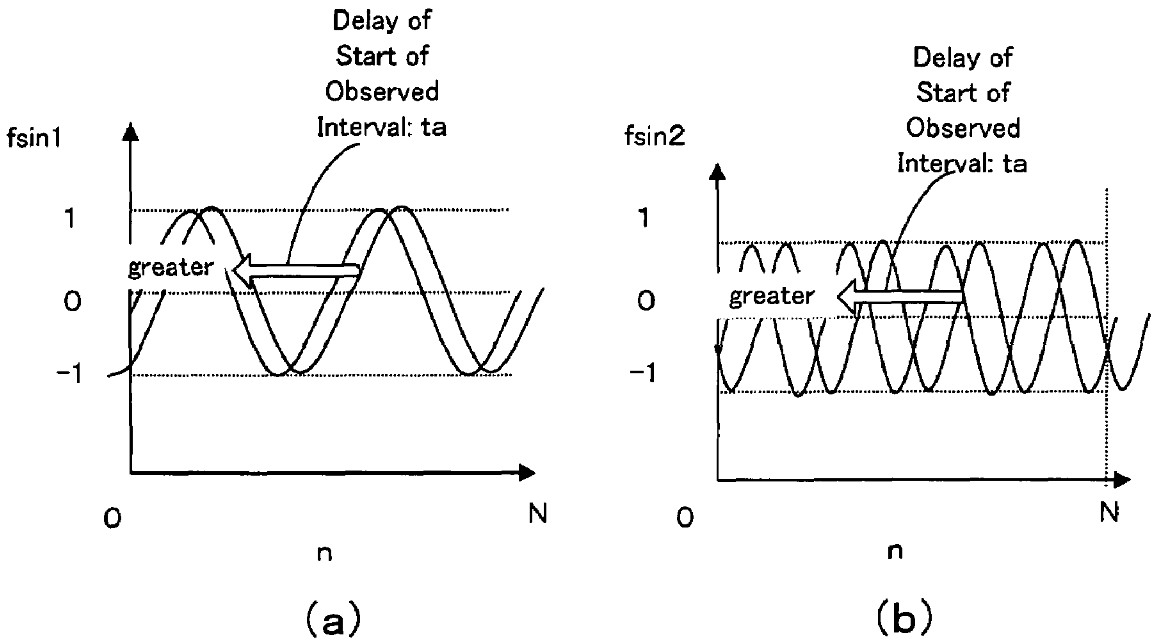
FIG. 18 A map showing a reference signal phase-shifted in accordance with a delay of a starting time of an observed interval in accordance with the second embodiment of the present invention.

An example of the maps for f sin 1 and f sin 2 are shown in FIGS. 18(*a*) and 18(*b*), respectively. Referring to the map of (a) as an example, fsin1 is more advanced as the delay "ta" increases.

An in-cylinder pressure Fourier coefficient determining unit 205 determines the Fourier coefficients b1 and b2 of the in-cylinder pressure based on the in-cylinder pressure sample Pn and f sin 1 and f sin 2 phase-shifted by the phase shifting unit 204, in accordance with the equations (21) and (22).

A calculation unit 206 calculates the indicated mean effective pressure Pmi by using the Fourier coefficients b1 and b2 of the in-cylinder pressure in accordance with the equation (20).

Figure 19:
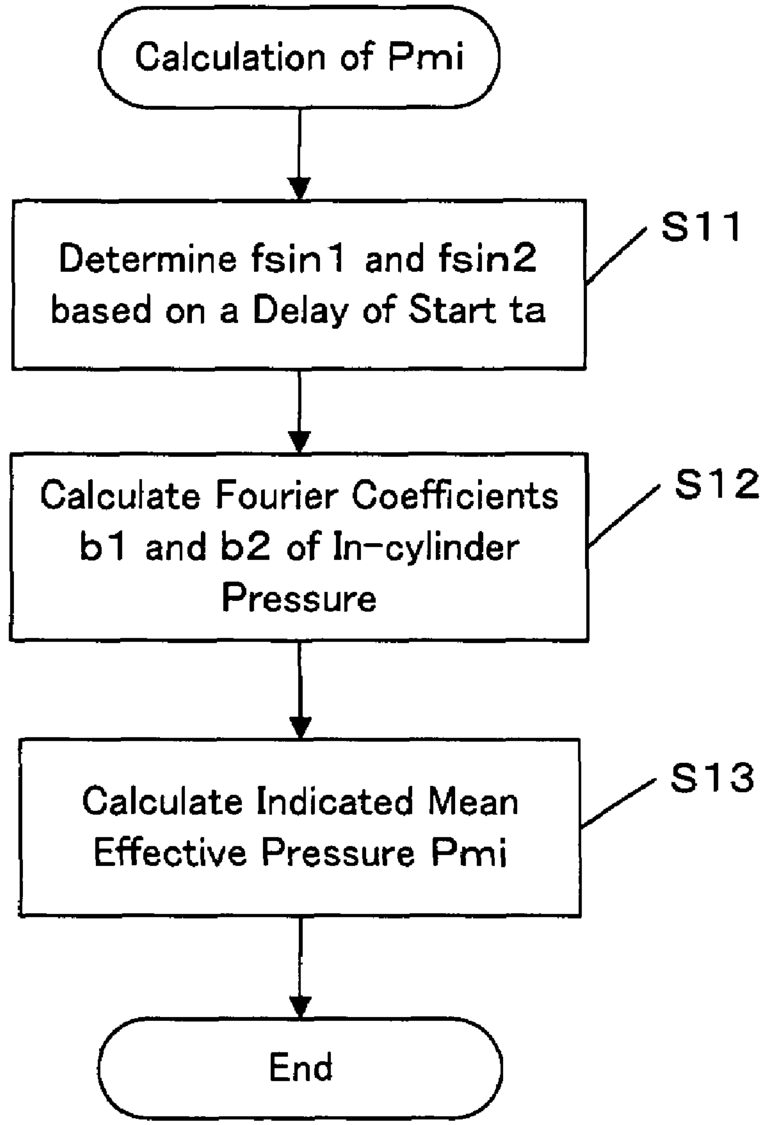
FIG. 19 A flowchart of a process for calculating an indicated mean effective pressure in accordance with the second embodiment of the present invention.

FIG. 19 is a flowchart of a process for calculating an indicated mean effective pressure in accordance with the second embodiment of the present invention. This process is typically performed by one or more programs stored in the memory 1*c* (FIG. 1). This process is activated, for example, in response to a predetermined trigger signal.

In this example, the indicated mean effective pressure is calculated for one combustion cycle (observed interval) immediately before the process is activated. During the observed interval, sampling of the in-cylinder pressure signal is performed. As a result, 2N samples Pn of the in-cylinder pressure are acquired.

In step S11, a map as shown in FIG. 18 is referred to based on the delay "ta" of the start of the observed interval to determine the phase-shifted sine functions f sin 1(n) and f sin 2(n).

In step S12, the 2N in-cylinder pressure samples acquired during the observed interval and the 2N phase-shifted f sin 1(n) and f sin 2(n) determined for the observed interval are used to determine the Fourier coefficients b1 and b2 of the in-cylinder pressure in accordance with the equations (21) and (22).

In step S13, based on the Fourier coefficients b1 and b2 of the in-cylinder pressure determined in step S12, the indicated mean effective pressure Pmi is calculated in accordance with the equation (20).

In the above second embodiment, a case in which the position of the observation deviates is described. However, even when a delay occurs in the in-cylinder pressure, the Fourier coefficients b1 and b2 can be calculated in a similar way to the first embodiment. Specifically, by retarding the reference signal established in the reference interval by the amount of the phase delay, the Fourier coefficients of the phase-delayed reference signal and the in-cylinder pressure can be calculated.

The present invention can be applied to a general-purpose internal-combustion engine such as an outboard motor.

The invention claimed is:

1. An apparatus for calculating work of an engine, the apparatus comprising:

means for pre-establishing, as a reference phase relation for a predetermined reference interval, a correlation in phase between an in-cylinder pressure of the engine and a reference signal consisting of a predetermined frequency component;

means for detecting an in-cylinder pressure of the engine for a given observed interval;

reference signal determining means for determining a reference signal corresponding to the detected in-cylinder pressure of the engine such that the reference phase relation is met;

correlation coefficient determining means for determining a correlation coefficient between the detected in-cylinder pressure of the engine and the determined reference signal for the observed interval; and work calculating means for calculating the work of the engine based on the correlation coefficient.

2. The apparatus of claim 1, wherein the correlation coefficient is a Fourier coefficient that is obtained by expanding the in-cylinder pressure into Fourier series.

3. The apparatus of claim 1, wherein the reference signal determining means further comprises:

phase delay determining means for determining a phase delay of the in-cylinder pressure detected in the observed interval with respect to the in-cylinder pressure in the reference interval;

means for establishing, in the observed interval, a reference signal same as the reference signal constituting the reference phase relation; and means for determining the reference signal corresponding to the detected in-cylinder pressure of the engine by retarding, by the determined phase delay, a phase of the reference signal established in the observed interval.

4. The apparatus of claim 3, further comprising means for detecting an operating condition of the engine, wherein the phase delay determining means determines the phase delay in accordance with the detected operating condition of the engine.

5. The apparatus of claim 1, wherein the reference signal determining means further comprises:

delay determining means for determining a delay of a starting time of the observed interval with respect to a starting time of the reference interval;

means for establishing, in the observed interval, a reference signal same as the reference signal constituting the reference phase relation; and means for determining the reference signal corresponding to the detected in-cylinder pressure of the engine by advancing, by the determined delay, a phase of the reference signal established in the observed interval.

6. The apparatus of claim 5, wherein the delay determining means determines the delay in accordance with a relative difference between the starting time of the reference interval and the starting time of the observed interval.

7. An apparatus for calculating work of an engine, the apparatus comprising:

component determining means for determining a frequency component desired for calculating the engine work, among frequency components acquired by frequency-resolving a volume change rate of the engine;

means for pre-establishing, as a reference phase relation for a predetermined reference interval, a correlation in phase between an in-cylinder pressure of the engine and a reference signal consisting of the determined frequency component;

reference signal determining means for determining a reference signal corresponding to an in-cylinder pressure in a given observed interval such that the reference phase relation is met;

first determination means for determining a first correlation coefficient between the in-cylinder pressure of the engine in the observed interval and the determined reference signal;

second determination means for determining a second correlation coefficient between the volume change rate of the engine in the observed interval and the determined reference signal; and work calculating means for calculating the engine work based on the first correlation coefficient and the second correlation coefficient.

8. The apparatus of claim 7, further comprising:

a mechanism for changing a stroke volume of the engine; and stroke volume determining means for determining the stroke volume, wherein the work calculating means calculates the engine work based on the stroke volume, the first correlation coefficient and the second correlation coefficient.

9. The apparatus of claim 7, further comprising means for detecting an operating condition of the engine, wherein the component determining means determines the desired frequency component based on the detected operating condition of the engine.

10. The apparatus of claim 1, wherein the engine work comprises an indicated mean effective pressure.

11. A method for calculating work of an engine, comprising:

(a) pre-establishing, as a reference phase relation for a predetermined reference interval, a correlation in phase between an in-cylinder pressure of the engine and a reference signal consisting of a predetermined frequency component;

(b) detecting an in-cylinder pressure of the engine in a given observed interval;

(c) determining a reference signal corresponding to the detected in-cylinder pressure of the engine such that the reference phase relation is met;

(d) determining a correlation coefficient between the detected in-cylinder pressure of the engine and the determined reference signal for the observed interval; and (e) calculating the engine work based on the correlation coefficient.

12. The method of claim 11, wherein the correlation coefficient is a Fourier coefficient that is obtained by expanding the in-cylinder pressure into Fourier series.

13. The method of claim 11, wherein the step (c) further comprises:

(c1)determining a phase delay of the in-cylinder pressure detected in the observed interval with respect to the in-cylinder pressure in the reference interval;

(c2) establishing, in the observed interval, a reference signal same as the reference signal constituting the reference phase relation; and (c3) determining the reference signal corresponding to the detected in-cylinder pressure of the engine by retarding, by the determined phase delay, a phase of the reference signal established in the observed interval.

14. The method of claim 13, further comprising detecting an operating condition of the engine, wherein the step (c1) determines the phase delay in accordance with the detected operating condition of the engine.

15. The method of claim 11, wherein the step (c) further comprises:

(c1) determining a delay of a starting time of the observed interval with respect to a starting time of the reference interval;

(c2) establishing, in the observed interval, a reference signal same as the reference signal constituting the reference phase relation; and (c3) determining the reference signal corresponding to the detected in-cylinder pressure of the engine by advancing, by the determined delay, a phase of the reference signal established in the observed interval.

16. The method as claimed of claim 15, wherein the step (c1) determines the delay in accordance with a relative difference between the starting time of the reference interval and the starting time of the observed interval.

17. A method for calculating work of an engine, comprising:

(a) determining a frequency component desired for calculating the engine work engine, among frequency components that are obtained by frequency-resolving a volume change rate of the engine;

(b) pre-establishing, as a reference phase relation for a predetermined reference interval, a correlation in phase between an in-cylinder pressure of the engine and a reference signal consisting of the determined components;

(c) determining a reference signal corresponding to an in-cylinder pressure in a given observed interval such that the reference phase relation is met;

(d) determining a first correlation coefficient between the in-cylinder pressure of the engine in the observed interval and the determined reference signal;

(e) determining a second correlation coefficient between the volume change rate of the engine in the observed interval and the determined reference signal; and (f) calculating the engine work based on the first correlation coefficient and the second correlation coefficient.

18. The method of claim 17, further comprising determining a stroke volume of the engine, wherein the step (f) includes calculating the engine work based on the stroke volume, the first correlation coefficient and the second correlation coefficient.

19. The method of claim 17, further comprising detecting an operating condition of the engine, wherein the step (a) includes determining the desired component based on the detected operating condition of the engine.

20. The method of claim 11, wherein the engine work comprises an indicated mean effective pressure.

21. An apparatus for calculating work of an engine, the apparatus comprising a control unit configured to:

pre-establish, as a reference phase relation for a predetermined reference interval, a correlation in phase between an in-cylinder pressure of the engine and a reference signal consisting of a predetermined frequency component;

detect an in-cylinder pressure of the engine for a given observed interval;

determine a reference signal corresponding to the detected in-cylinder pressure of the engine such that the reference phase relation is met;

determine a correlation coefficient between the detected in-cylinder pressure of the engine and the determined reference signal for the observed interval; and calculate the work of the engine based on the correlation coefficient.

22. The apparatus of claim 21, wherein the correlation coefficient is a Fourier coefficient that is obtained by expanding the in-cylinder pressure into Fourier series.

23. The apparatus of claim 21, wherein the control unit is further configured to:

determine a phase delay of the in-cylinder pressure detected in the observed interval with respect to the in-cylinder pressure in the reference interval;

establish, in the observed interval, a reference signal same as the reference signal constituting the reference phase relation; and determine the reference signal corresponding to the detected in-cylinder pressure of the engine by retarding, by the determined phase delay, a phase of the reference signal established in the observed interval.

24. The apparatus of claim 23, wherein the control unit is further configured to:

detect an operating condition of the engine; and determine the phase delay in accordance with the detected operating condition of the engine.

25. The apparatus of claim 21, wherein the control unit is further configured to:

determine a delay of a starting time of the observed interval with respect to a starting time of the reference interval;

establish, in the observed interval, a reference signal same as the reference signal constituting the reference phase relation; and determine the reference signal corresponding to the detected in-cylinder pressure of the engine by advancing, by the determined delay, a phase of the reference signal established in the observed interval.

26. The apparatus of claim 25, wherein the control unit is further configured to determine the delay in accordance with a relative difference between the starting time of the reference interval and the starting time of the observed interval.

27. An apparatus for calculating work of an engine, the apparatus comprising a control unit configured to:

determine a frequency component desired for calculating the engine work, among frequency components acquired by frequency-resolving a volume change rate of the engine;

pre-establish, as a reference phase relation for a predetermined reference interval, a correlation in phase between an in-cylinder pressure of the engine and a reference signal consisting of the determined frequency component;

determine a reference signal corresponding to an in-cylinder pressure in a given observed interval such that the reference phase relation is met;

determine a first correlation coefficient between the in-cylinder pressure of the engine in the observed interval and the determined reference signal;

determine a second correlation coefficient between the volume change rate of the engine in the observed interval and the determined reference signal; and calculate the engine work based on the first correlation coefficient and the second correlation coefficient.

28. The apparatus of claim 27, further comprising a mechanism for changing a stroke volume of the engine; and wherein the control unit is further configured to:

determine the stroke volume; and calculate the engine work based on the stroke volume, the first correlation coefficient and the second correlation coefficient.

29. The apparatus of claim 27, wherein the control unit is further configured to:

detect an operating condition of the engine, determine the desired frequency component based on the detected operating condition of the engine.

30. The apparatus of claim 21, wherein the engine work comprises an indicated mean effective pressure.

* * * * *